(12) United States Patent
Shigemasa et al.

(10) Patent No.: US 12,454,448 B2
(45) Date of Patent: Oct. 28, 2025

(54) CONTROL METHOD, CONTROL DEVICE, AND CONTROL SYSTEM FOR DETECTING ABNORMALITY IN AUTOMATIC FORKLIFT OPERATION

(71) Applicants: TOYOTA JIDOSHA KABUSHIKI KAISHA, Toyota (JP); SHINMEI INDUSTRY CO., LTD., Aichi (JP); KABUSHIKI KAISHA TOYOTA JIDOSHOKKI, Kariya (JP)

(72) Inventors: Takumi Shigemasa, Toyota (JP); Daisuke Asami, Toyota (JP); Yoshiaki Sato, Toyota (JP); Yutaka Oshima, Miyoshi (JP); Tatsuya Mita, Kariya (JP)

(73) Assignees: TOYOTA JIDOSHA KABUSHIKI KAISHA, Toyota (JP); SHINMEI INDUSTRY CO., LTD., Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 294 days.

(21) Appl. No.: 18/315,038

(22) Filed: May 10, 2023

(65) Prior Publication Data
US 2023/0382703 A1 Nov. 30, 2023

(30) Foreign Application Priority Data
May 30, 2022 (JP) .................................. 2022-087886

(51) Int. Cl.
*B66F 9/075* (2006.01)
*B66F 9/06* (2006.01)

(52) U.S. Cl.
CPC ............ *B66F 9/0755* (2013.01); *B66F 9/063* (2013.01)

(58) Field of Classification Search
CPC .......... B66F 9/0755; B66F 9/063; B66F 9/24; B66F 9/06; B66F 9/07504
(Continued)

(56) References Cited

U.S. PATENT DOCUMENTS

| 2012/0060383 A1* | 3/2012 | Goddard | ............... B66F 9/0755 |
| | | | 33/299 |
| 2020/0377351 A1* | 12/2020 | Uchimura | .................. B66F 9/24 |

(Continued)

FOREIGN PATENT DOCUMENTS

| JP | H06-115897 A | 4/1994 |
| JP | H08-169698 A | 7/1996 |
| JP | H11-021098 A | 1/1999 |

*Primary Examiner* — Abby J Flynn
*Assistant Examiner* — Sean Patrick Reidy
(74) *Attorney, Agent, or Firm* — Oliff PLC

(57) ABSTRACT

A control system configured to control a forklift to unload a transport pallet onto an unloading place includes a control device configured to control at least one of movement of the forklift and horizontal movement of a fork, the forklift including a load sensor configured to detect load of an item placed on the fork, and a lift height sensor configured to detect a lift height of the fork, control raising and lowering of the fork, acquire load information of the transport pallet placed on the fork and lift height range information, the lift height range information indicating a lift height range, the lift height range being a range of height in which the fork is able to be inserted when unloading onto the unloading place is successful, and determine whether an abnormality is present.

10 Claims, 19 Drawing Sheets

| PALLET PA | | FORK LIFT HEIGHT (mm) | |
|---|---|---|---|
| | | LOWER LIMIT VALUE | UPPER LIMIT VALUE |
| NUMBER OF TIERS | SECOND TIER | 900 | 1010 |
| | THIRD TIER | 1850 | 1960 |
| | FOURTH TIER | 2800 | 2910 |
| | FIFTH TIER | 3750 | 3860 |

(58) Field of Classification Search
USPC .......................................................... 701/50
See application file for complete search history.

(56) References Cited

U.S. PATENT DOCUMENTS

2022/0288787 A1* 9/2022 Dupree .................... B25J 13/08
2022/0375206 A1* 11/2022 Onoda .................... B66F 9/142

* cited by examiner

FIG. 6

| PALLET PA | | FORK LIFT HEIGHT (mm) | |
|---|---|---|---|
| | | LOWER LIMIT VALUE | UPPER LIMIT VALUE |
| NUMBER OF TIERS | SECOND TIER | 900 | 1010 |
| | THIRD TIER | 1850 | 1960 |
| | FOURTH TIER | 2800 | 2910 |
| | FIFTH TIER | 3750 | 3860 |

CONTROL METHOD, CONTROL DEVICE, AND CONTROL SYSTEM FOR DETECTING ABNORMALITY IN AUTOMATIC FORKLIFT OPERATION

CROSS-REFERENCE TO RELATED APPLICATION

This application claims priority to Japanese Patent Application No. 2022-087886 filed on May 30, 2022, incorporated herein by reference in its entirety.

BACKGROUND

1. Technical Field

The present disclosure relates to control methods, control devices, and control systems.

2. Description of Related Art

The operation of a forklift that loads and unloads is controlled by a predetermined control program. When stacking pallets with cargo by a forklift, it is necessary to stack the pallets by, for example, fitting the legs of the pallet to be unloaded on support portions formed in the upper part of the pallet onto which the pallet to be unloaded is unloaded, namely the pallet onto which the pallet to be unloaded is stacked. Such work requires extremely high operational accuracy.

Japanese Unexamined Patent Application Publication No. 06-115897 (JP 06-115897 A) describes a method for stacking post pallets by a forklift. This method is intended to easily and reliably stacking post pallets in the vertical direction. In this stacking method, marks are put at a plurality of positions on the upper surface of a post pallet facing a pair of right and left forks, and mark detection sensors are mounted on the lower surfaces of the forks facing the marks. When each mark detection sensor detects a corresponding one of the marks on the post pallet located below during the operation of lowering the forks from above with respect to the post pallet, the post pallet placed on the forks is unloaded onto the post pallet below.

SUMMARY

However, in the method disclosed in JP 06-115897 A, it is necessary to recognize the position of the pallet below before stacking a pallet, and a sensor for this purpose is required, which increases cost. In the method described in JP 06-115897 A, when stacking pallets, collapse of load may occur because, for example, a pallet cannot be properly placed on the pallet below or a pallet may be caught by an adjacent object. This is mainly because the forklift cannot accurately recognize its own position (hereinafter sometimes referred to as "self-position") and cannot move the forks to the correct position.

Therefore, there is a demand for a technique of detecting such an abnormality that causes collapse of load in advance at low cost.

The present disclosure provides a control method, control device, and control system that can detect, at low cost, such an abnormality that causes collapse of load when a forklift unloads a transport pallet onto an unloading place.

A first aspect of the present disclosure is a control method. The control method is a control method for controlling a forklift to unload a transport pallet onto an unloading place, the forklift including a load sensor configured to detect load of an item placed on a fork, and a lift height sensor configured to detect a lift height of the fork. The control method includes: acquiring load information of the transport pallet placed on the fork and lift height range information, the lift height range information indicating a lift height range, the lift height range being a range of height in which the fork is able to be inserted when unloading onto the unloading place is successful; performing a lowering operation based on the acquired load information and the acquired lift height range information, the lowering operation being an operation of lowering the fork with the transport pallet from above the unloading place; performing an operation of pulling out the fork when a load value detected by the load sensor is equal to or less than a predetermined value and a lift height value detected by the lift height sensor is within the lift height range; and determining an abnormality is present when one of a first condition and a second condition is satisfied during the lowering operation. The first condition is a condition that the lift height value is equal to or less than a lower limit value of the lift height range, and the second condition is a condition that the load value is equal to or less than the predetermined value and the lift height value is equal to or larger than an upper limit value of the lift height range.

In the first aspect, whether there is such an abnormality that causes collapse of load is determined based on the load information and lift height range information. Therefore, according to the first aspect, such an abnormality that causes collapse of load when the forklift unloads the transport pallet onto the unloading place can be detected at low cost.

In the first aspect, the lift height range may be a range in which the fork is able to be inserted when the unloading place is a ground or an object that is not transportable by the forklift and the transport pallet is successfully placed onto the object. The lift height range may be a range in which the fork is able to be inserted when the unloading place is an unload pallet and the transport pallet is successfully placed onto the unload pallet. The unload pallet may be a transport pallet on which the transport pallet is to be stacked.

According to the above configuration, such an abnormality that causes collapse of load can be detected at low cost even when the unloading place is a pallet on which the transport pallet can be stacked.

In the first aspect, the control method may further include, when determination is made during the lowering operation that the abnormality is present, resuming the lowering operation at an initial position by returning to the initial position that is a position where the lowering operation is started.

According to the above configuration, it is possible to attempt unloading again even when collapse of load is likely to occur. This can increase the possibility that unloading can be performed without causing collapse of load.

In the first aspect, the control method may further include, stopping control for the unloading onto the unloading place when the number of determination times that the abnormality is present during the lowering operation reaches a predetermined value.

According to the above configuration, repeated unloading attempts can be prevented when there is a high possibility of collapse of load.

In the first aspect, the control method may further include, resuming at a predetermined position an operation of moving the forklift to a position where the lowering operation is to be performed by returning the forklift to the predetermined position when determination is made that the abnormality is present during the lowering operation.

According to the above configuration, it is possible to attempt unloading again even when collapse of load is likely to occur. This can increase the possibility that unloading can be performed without causing collapse of load.

In the first aspect, the lift height range may be a range that is indicated by the acquired lift height range information, or a range that is to be used for determination that the abnormality is present. The lift height range calculated based on a type of the transport pallet may be set by adding a variation value among a plurality of the transport pallets.

According to the above configuration, such an abnormality that causes collapse of load can be detected in consideration of variation among the transport pallets.

In the first aspect, the forklift may be an unmanned forklift.

According to the above configuration, collapse of load can be prevented or reduced even when the forklift is an unmanned forklift that cannot be directly checked by a person.

In the first aspect, the control method may further include: acquiring first information at a position where the transport pallet is to be placed onto the fork, the first information being information on the transport pallet; performing a checking process of checking the acquired first information against second information, the second information being information on the transport pallet corresponding to the acquired load information and the acquired lift height range information; and performing the lowering operation when the checking process is successful.

According to the above configuration, the possibility that the transport pallet may be transported to a wrong unloading place can be eliminated or reduced, and such unloading onto the unloading place that causes collapse of load can be prevented or reduced.

A second aspect of the present disclosure is a control device. The control device is a control device configured to control a forklift to unload a transport pallet onto an unloading place, the forklift including a load sensor configured to detect load of an item placed on a fork, and a lift height sensor configured to detect a lift height of the fork. The control device includes: a movement control unit configured to control at least one of movement of the forklift and horizontal movement of the fork; a lift control unit configured to control raising and lowering of the fork; an acquisition unit configured to acquire load information of the transport pallet placed on the fork and lift height range information, the lift height range information indicating a lift height range, the lift height range being a range of height in which the fork is able to be inserted when unloading onto the unloading place is successful; and a determination unit configured to determine whether an abnormality is present. The lift control unit is configured to perform a lowering operation based on the load information and the lift height range information that are acquired by the acquisition unit, the lowering operation being an operation of lowering the fork with the transport pallet from above the unloading place. The movement control unit is configured to perform an operation of pulling out the fork when a load value detected by the load sensor is equal to or less than a predetermined value and a lift height value detected by the lift height sensor is within the lift height range. The determination unit is configured to determine that an abnormality is present when one of a first condition and a second condition is satisfied during the lowering operation. The first condition is a condition that the lift height value is equal to or less than a lower limit value of the lift height range; and the first condition is a condition that the load value is equal to or less than the predetermined value and the lift height value is equal to or larger than an upper limit value of the lift height range.

In the second aspect, whether there is such an abnormality that causes collapse of load is determined based on the load information and lift height range information. Therefore, according to the second aspect, such an abnormality that causes collapse of load when the forklift unloads the transport pallet onto the unloading place can be detected at low cost.

A third aspect of the present disclosure is a control system configured to control a forklift to unload a transport pallet onto an unloading place. The control system includes a control device. The control device is configured to control either or both of movement of the forklift and horizontal movement of a fork. The forklift includes a load sensor configured to detect load of an item placed on the fork, and a lift height sensor configured to detect a lift height of the fork. The control device is configured to control raising and lowering of the fork. The control device is configured to acquire load information of the transport pallet placed on the fork and lift height range information. The lift height range information indicates a lift height range. The lift height range is a range of height in which the fork is able to be inserted when unloading onto the unloading place is successful. The control device is configured to determine whether an abnormality is present. The control device is configured to perform a lowering operation based on the acquired load information and the acquired lift height range information, the lowering operation being an operation of lowering the fork with the transport pallet from above the unloading place. The control device is configured to perform an operation of pulling out the fork when a load value detected by the load sensor is equal to or less than a predetermined value and a lift height value detected by the lift height sensor is within the lift height range. The control device is configured to determine that an abnormality is present when one of a first condition and a second condition is satisfied during the lowering operation. The first condition is a condition that the lift height value is equal to or less than a lower limit value of the lift height range, and the second condition is a condition that the load value is equal to or less than the predetermined value and the lift height value is equal to or larger than an upper limit value of the lift height range.

In the third aspect, whether there is such an abnormality that causes collapse of load is determined based on the load information and lift height range information. Therefore, according to the third aspect, such an abnormality that causes collapse of load when the forklift unloads the transport pallet onto the unloading place can be detected at low cost.

According to the first, second, and third aspects of the present disclosure, the control method, control device, and control system can be provided that can detect, at low cost, such an abnormality that causes collapse of load when a forklift unloads a transport pallet onto an unloading place.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows an example of data that is registered in a database;

DETAILED DESCRIPTION OF EMBODIMENTS

Hereinafter, the present disclosure will be described based on an embodiment of the disclosure, but the disclosure according to the claims is not limited to the following embodiment. Not all of the configurations described in the embodiment are essential as means for solving the problems. Hereinafter, an embodiment will be described with reference to the drawings.

Embodiment

Figure 1:
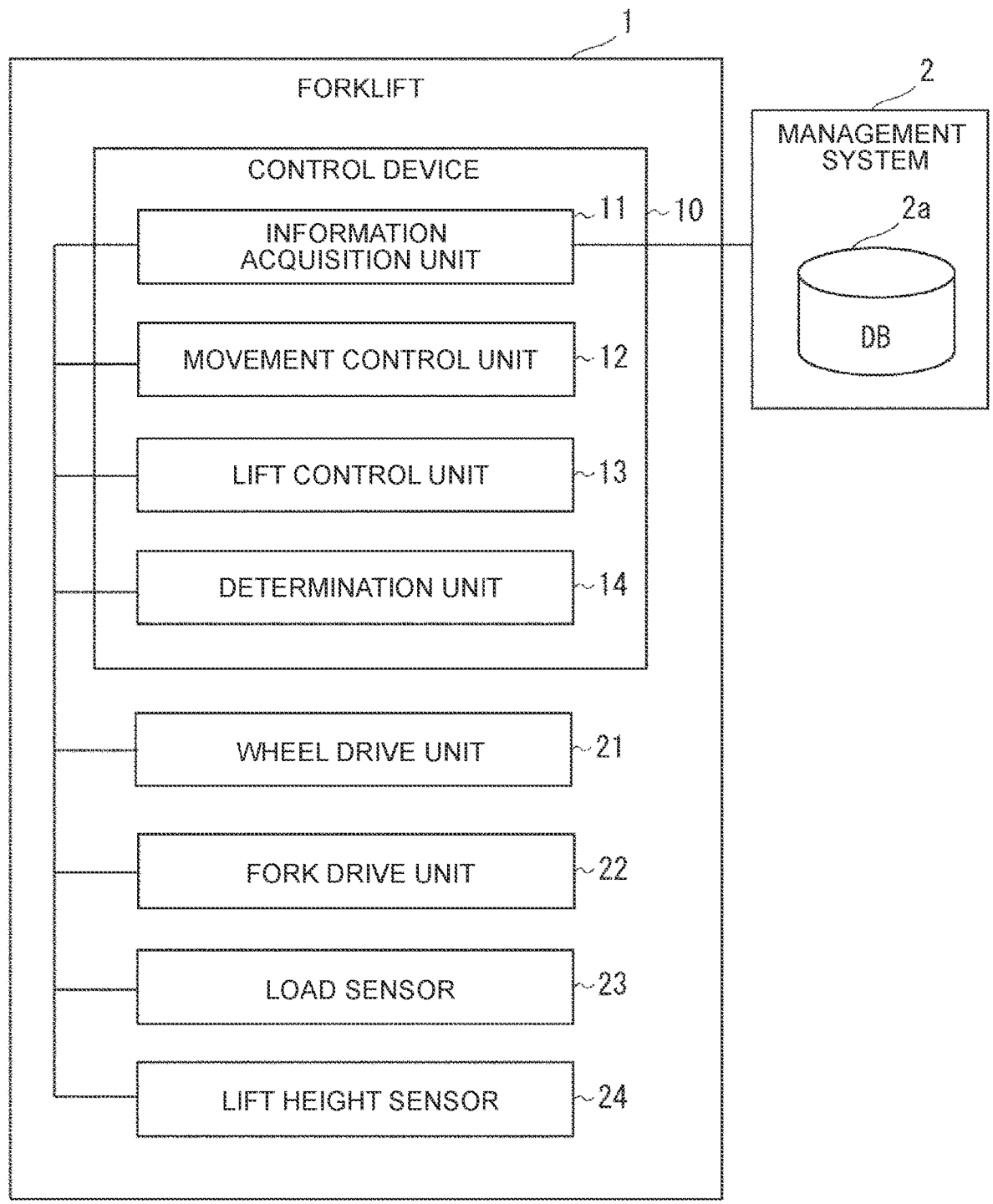
FIG. 1 is a block diagram showing an example of the configuration of a forklift according to an embodiment.
Figure 2:
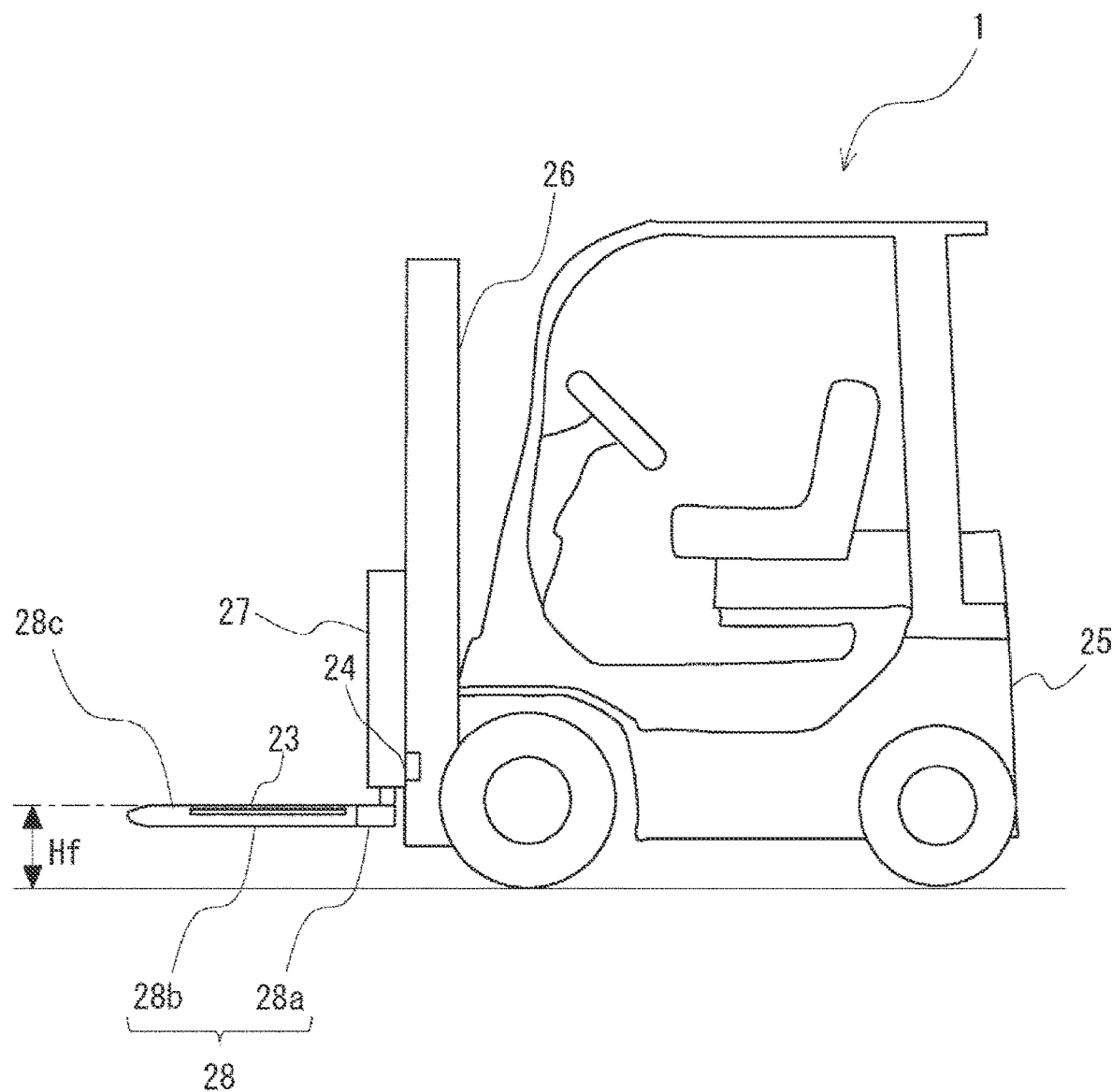
FIG. 2 is a side view showing an example of the appearance of the forklift according to the embodiment.
Figure 3:
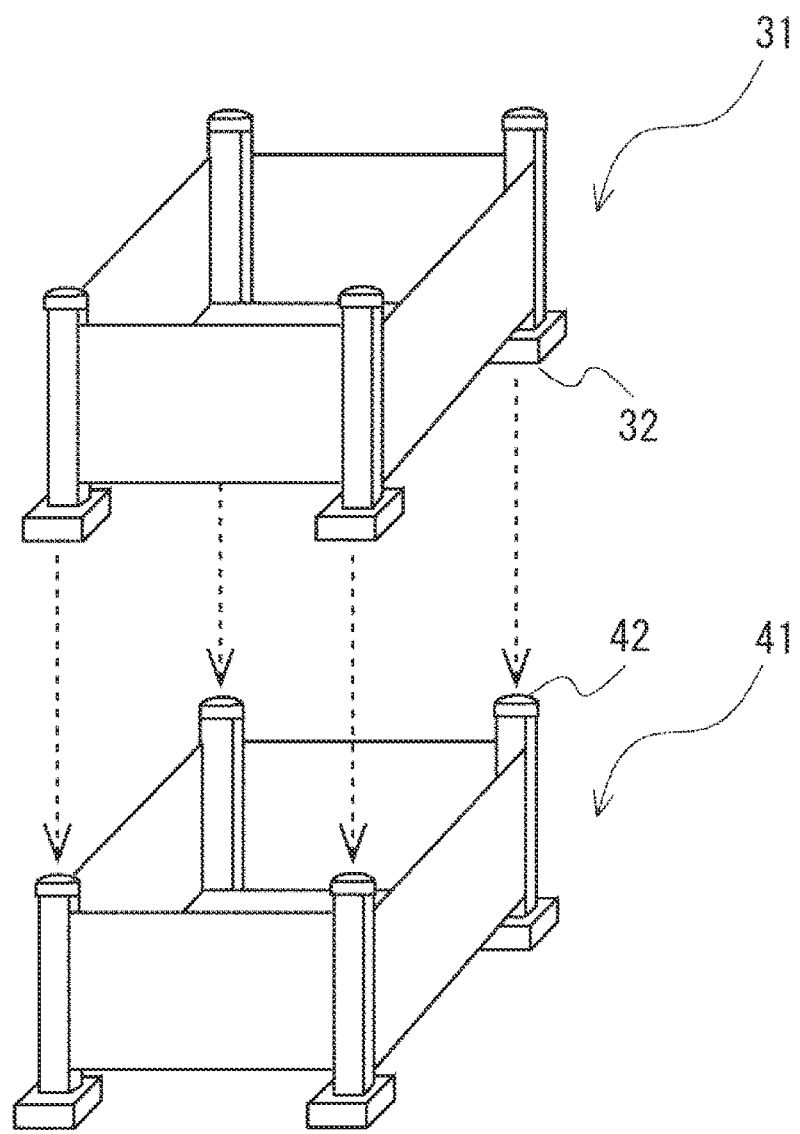
FIG. 3 is a perspective view showing an example of a transport pallet and an unload pallet.

FIG. 1 is a block diagram showing an example of the configuration of a forklift according to an embodiment, and FIG. 2 is a side view showing an example of the appearance of the forklift according to the embodiment. FIG. 3 is a perspective view showing an example of a transport pallet and an unload pallet.

As shown in FIG. 1, a forklift 1 according to the present embodiment includes a control device 10 according to the present embodiment, a wheel drive unit 21, a fork drive unit 22, a load sensor 23, and a lift height sensor 24. As shown in FIG. 2, the forklift 1 according to the present embodiment can include a body 25 of the forklift 1, a mast 26, a fork lift unit 27, and forks 28.

The wheel drive unit 21 drives the wheels of the forklift 1 to cause the forklift 1 to travel (move). The wheel drive unit 21 drives the wheels to rotate. The wheel drive unit 21 can drive the wheels to turn in the right or left direction as desired by using the rotation difference between the right and left wheels or by performing control to change the direction of the axles of the wheels. The fork drive unit 22 drives the fork lift unit 27 to move up and down with respect to the mast 26 attached to the front of the body 25, thereby raising and lowering the forks 28.

A total of two forks 28, namely the right and left forks 28, can be configured as one set. However, the number of forks 28 may be three or more. Each fork 28 can be composed of, for example, two portions 28a, 28b. Each fork 28 may be configured so that the portion 28b horizontally extends and retracts with respect to the portion 28a connected to the fork lift unit 27. When using such a configuration, the fork drive unit 22 drives the portions 28b to horizontally extend and retract with respect to the portions 28a, thereby changing the length of the forks 28. However, the forks 28 are not limited to the example including such a horizontal telescopic mechanism, and may not include a telescopic mechanism.

Each fork 28 may be configured so that the angle of the portion 28b with respect to the portion 28a connected to the fork lift unit 27, as viewed in the horizontal direction, can be changed. When using such a configuration, the fork drive unit 22 drives the portions 28b to tilt upward, horizontally, downward with respect to the portions 28a to change the vertical angle (angle of elevation or depression) of the portions 28b in the distal end portions of the forks 28. A mechanism capable of tilting the mast 26 vertically with respect to the body 25 may be provided to change the angle of elevation or depression of the portions 28b.

The load sensor 23 can be mounted on, for example, upper surfaces 28c of the forks 28. The load sensor 23 detects the load of an item(s) (cargo) placed on the forks 28, and transfers the detected load to the control device 10. The load sensor 23 may be mounted at a position other than on the forks 28, such as between the forks 28 and the fork lift unit 27 or between the fork lift unit 27 and the mast 26. Mounting the load sensor 23 at any of these positions can prevent or reduce damage or erroneous detection of the load sensor 23 as compared to the case where the load sensor 23 is mounted on the upper surfaces 28c. The load sensor 23 may use any detection method. Even when a forklift is not originally equipped with the load sensor 23, the forklift 1 can be configured by installing the load sensor 23 afterwards, and such a forklift 1 can perform the functions of the present embodiment.

The lift height sensor 24 is a sensor that detects the lift height of the forks 28. That is, the lift height sensor 24 is a sensor that detects the height Hf from the ground to the upper surfaces 28c of the forks 28 when the forklift 1 is located on the horizontal ground. The lift height sensor 24 may use any detection method. The lift height sensor 24 can be mounted on, for example, the mast 26, and can be, for example, a red-green-blue (RGB) camera, an infrared camera, etc. However, the lift height sensor 24 is not limited to this example, and may be, for example, a distance measuring sensor mounted on the lower surfaces of the forks 28, or an acquisition unit that acquires control values for the fork lift unit 27. The height Hf may be defined as the height from the ground to the lower surfaces of the forks 28, as in the example in which the lift height sensor 24 is a distance measuring sensor mounted on the lower surfaces of the forks 28. The height Hf may be defined as the height from the ground to a predetermined vertical position of the forks 28, such as the height from the ground to the middle between the upper surface 28c and the lower surface of the forks 28. The upper and lower limit values of the lift height range are defined according to the definition of the height Hf. Even when a forklift is not originally equipped with the lift height sensor 24, the forklift 1 can be configured by installing the lift height sensor 24 afterwards, and such a forklift 1 can perform the functions of the present embodiment.

The control device 10 is a device that controls the wheel drive unit 21, the fork drive unit 22, the load sensor 23, and the lift height sensor 24. As shown in FIG. 1, the control device 10 can include an information acquisition unit 11, a movement control unit 12, a lift control unit 13, and a determination unit 14. The forklift 1 can thus be controlled to unload a transport pallet onto an unloading place. Therefore, a control method according to the present embodiment can also be referred to as an unload method for the forklift 1.

The control device 10 may include a main control unit (not shown) that controls the entire control device 10. The main control unit can be implemented by, for example, a processor such as a central processing unit (CPU) or a microprocessor unit (MPU), a working memory, a nonvolatile storage device, etc. Control programs to be executed by the processor are stored in the storage device, and the functions of units 11 to 14 that will be described later can be performed by the processor loading the programs into the working memory and executing them. The main control unit can be implemented by a configuration including an integrated circuit.

The information acquisition unit 11 acquires information from a database (DB) 2a. The DB 2a can be stored in a management system 2 that includes a computer wirelessly connected to the forklift 1. In this case, the information acquisition unit 11 may include a wireless communication unit that wirelessly communicates with the management system 2, and the management system 2 may also include a wireless communication unit that wirelessly communicates with the forklift 1. The DB 2a may be stored in a storage device inside the control device 10 of the forklift 1. In the following description, it is assumed that the information acquisition unit 11 acquires information from the DB 2a. However, part or all of information to be acquired may be information stored as setting information etc. in the storage device of the control device 10, an internal memory of the determination unit 14, etc.

The DB 2a stores load information of a transport pallet 31 to be placed on the forks 28 and lift height range information. The lift height range information is information indicating a lift height range that is a range of height in which the forks 28 can be inserted when unloading onto an unloading place is successful. The load information and the lift height range information can be stored for each type of transport pallet 31. The lift height range refers to the range of height in which the forks 28 can be moved up and down (raised and lowered) when unloading onto an unloading place is successful. An unload pallet 41 is a pallet having the same shape as the transport pallet 31. Therefore, it can be said that the load information and the lift height range information can be stored for each type of transport pallet 31 and unload pallet 41. However, the unload pallet 41 is not limited to the pallet having the same shape as the transport pallet 31, and may be a pallet having a different shape from the transport pallet 31 as long as the transport pallet 31 can be stacked thereon. The information acquisition unit 11 acquires information including the load information and the lift height range information from the DB 2a.

As shown in FIG. 3, the transport pallet 31 may include, for example, four legs 32 in its lower part, and may include support portions in its upper part. The support portions correspond to support portions 42 of the unload pallet 41 shown in FIG. 3. Each leg 32 of the transport pallet 31 and each support portion 42 of the unload pallet 41 that serves as an unloading place are formed in such a shape that the leg 32 and the support portion 42 can be engaged with each other such as fitted together.

With such a configuration, as shown by dashed arrows in FIG. 3, the transport pallet 31 can be stacked on the unload pallet 41 by lowering the transport pallet 31 toward the unload pallet 41 to engage the legs 32 of the transport pallet 31 with the support portions 42 formed in the upper part of the unload pallet 41.

The movement control unit 12 controls either or both of movement of the forklift 1 and horizontal movement of the forks 28. The movement of the forklift 1 can be implemented by the movement control unit 12 controlling the wheel drive unit 21. For this control, the forklift 1 has a self-position measuring function or a self-position estimation function, not shown, and the forklift 1 is controlled to move to a desired location based on the measured or estimated self-position. As for the movement of the forks 28, the movement control unit 12 controls the fork drive unit 22 to control horizontal extension and retraction of the portions 28b with respect to the portions 28a.

The lift control unit 13 controls the fork drive unit 22 to control raising and lowering of the forks 28. In particular, the lift control unit 13 performs a lowering operation of lowering the forks 28 with the transport pallet 31 placed thereon from above the unloading place, based on the load information and lift height range information acquired by the information acquisition unit 11. The lift control unit 13 can also stop the lowering operation when (as soon as), for example, one of the following two conditions is satisfied: the load value detected by the load sensor 23 (load sensor value) becomes equal to or less than a predetermined value; and the lift height value detected by the lift height sensor 24 (lift height sensor value) becomes less than the lower limit value of the lift height range indicated by the lift height range information. When the load value is equal to or larger than the predetermined value, it means that the transport pallet 31 is located on the forks 28. That is, when the load value is less than the predetermined value, it means that the transport pallet 31 is not located on the forks 28.

When the load value detected by the load sensor 23 (load sensor value) becomes equal to or less than the predetermined value and the lift height value detected by the lift height sensor 24 (lift height sensor value) falls within the lift height range indicated by the lift height range information, the movement control unit 12 performs an operation of pulling out the forks 28 as a part of an operation of placing the transport pallet 31. The operation of placing the transport pallet 31 can mean an operation of unloading the transport pallet 31.

The determination unit 14 determines whether there is an abnormality. In particular, the determination unit 14 determines that there is an abnormality when one of the following two conditions is satisfied during the lowering operation: the lift height value is equal to or less than the lower limit value of the lift height range; and the load value is equal to or less than the predetermined value and the lift height value is equal to or larger than the upper limit value of the lift height range. Therefore, the control method according to the present embodiment can also be referred to as an unloading abnormality detection method for the forklift 1. A specific example of such determination will be described later.

In the present embodiment, whether there is such an abnormality that causes collapse of load is determined based on the load information and lift height range information stored in the DB 2a. According to the present embodiment, such an abnormality that causes collapse of load when the forklift 1 unloads the transport pallet 31 onto the unloading place can be detected at low cost. According to the present embodiment, collapse of load can thus be prevented or reduced. The unload pallet 41 is herein described as an example of the unloading place. However, even when the unloading place is a level ground etc., a similar operation can be performed by registering lift height range information for the level ground etc. in the DB 2a. A specific example of the case where the unloading place is a level ground will be described later.

The forklift 1 may be an unmanned forklift. An unmanned forklift can have either or both of an autonomous moving function or a function to autonomously raise and lower the forks 28 or autonomously extend and retract the forks 28. An unmanned forklift may not have the autonomous moving function or the function to autonomously raise and lower the forks 28 etc., or may be remotely controllable by a remote control device wirelessly connected to the forklift 1 with a camera etc., not shown, installed at or mounted on either or both of a work area and the forklift 1. Namely, an unmanned forklift may have any configuration as long as it is unmanned. Collapse of load can therefore be prevented or reduced even when the forklift 1 is an unmanned forklift that cannot be directly checked by a person. The forklift 1 may be a forklift that is operated by a person on board.

Although the control device 10 is described above, the control device 10 according to the present embodiment may be configured as a control system. The control system is a system in which the functions of the control device 10 are distributed to a plurality of devices, and may be configured to include the DB 2a like the management system 2.

Figure 4:
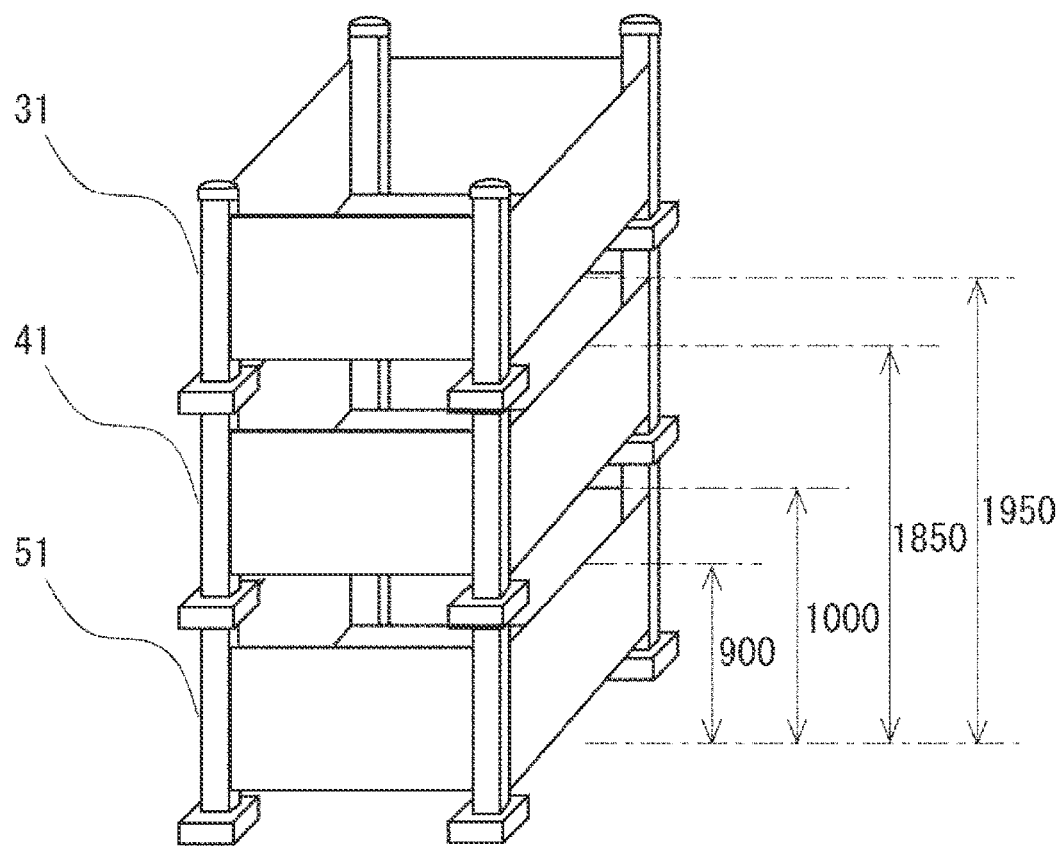
FIG. 4 illustrates an example of a lift height range and the case where it is determined that unloading is successful.
Figure 5:
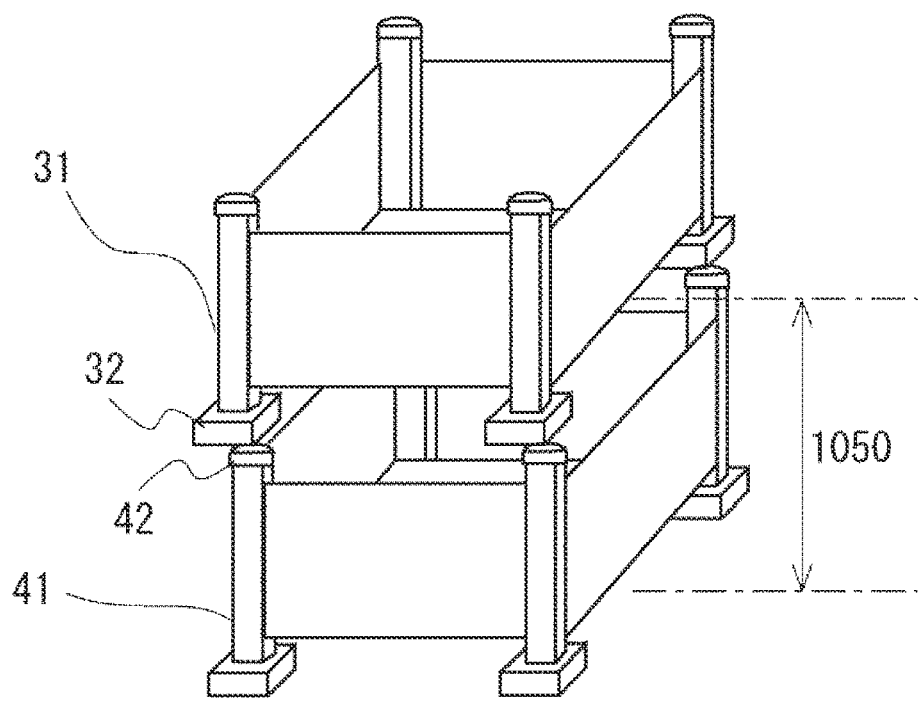
FIG. 5 illustrates the case where it is determined that there is an abnormality.

Next, an example of the lift height range information stored in the DB 2a will be described with reference to FIGS. 4 to 6. FIG. 4 illustrates an example of the lift height range and the case where it is determined that unloading is successful. FIG. 5 illustrates the case where it is determined that there is an abnormality. FIG. 6 shows an example of the data that is registered in the DB 2a.

Hereinafter, the transport pallet and unload pallets 41, 51 will be simply referred to as "pallets PA" when they need not be distinguished from each other. For example, the pallets PA may be iron pallets, wooden pallets, or resin pallets. The pallets PA may be made of any material, and may have any shape and size, but the pallets PA have a space into which the forks 28 can be inserted.

For the pallets PA (pallets 31, 41, and 51) that are supposed to be stacked in three tiers as shown in FIG. 4, the lift height range information as illustrated in FIG. 6 can be registered in the DB 2a. The lift height range is set in advance so that it will be determined that there is an abnormality in the case where, for example, the legs 32 are displaced with respect to the support portions 42 when the transport pallet 31 is placed onto the unload pallet 41 as shown in FIG. 5.

Therefore, in the example shown in FIG. 4, assuming that the insertion range of the forks 28 when they are inserted between the pallet 51 in the first tier and the pallet 41 in the second tier is 900 (mm) to 1000 (mm), the lower limit value of the lift height range can be set to 900 (mm) and the upper limit value of the lift height range can be set to 1010 (mm) as shown in FIG. 6. The upper limit value can be set to 1000 (mm). However, in this example, the upper limit value is set to 1010 (mm) in order to deal with the situation illustrated in FIG. 5. For example, this difference of 10 (mm) can be a value corresponding to the height of the overlapping part of the support portion 42 with the leg 32 when the support portion 42 is engaged with the leg 32. This will be described in detail later with reference to FIGS. 9 and 10.

FIG. 6 shows an example in which the lower and upper limit values of the lift height of the forks 28 are set for one type of pallets PA for the second to fifth tiers. FIG. 4 only shows an example in which the pallets are stacked in three tiers, and FIG. 6 shows an example that can deal with the situations where the pallets are stacked in up to five tiers. However, it should be understood that the lift height range information can be stored to make it possible to also deal with the situations where the pallets are stacked in six or more tiers. Pallets with shapes and sizes other than those of the pallets PA can be handled by similarly registering lift height range information for such pallets in the DB 2a as well.

Figure 7:
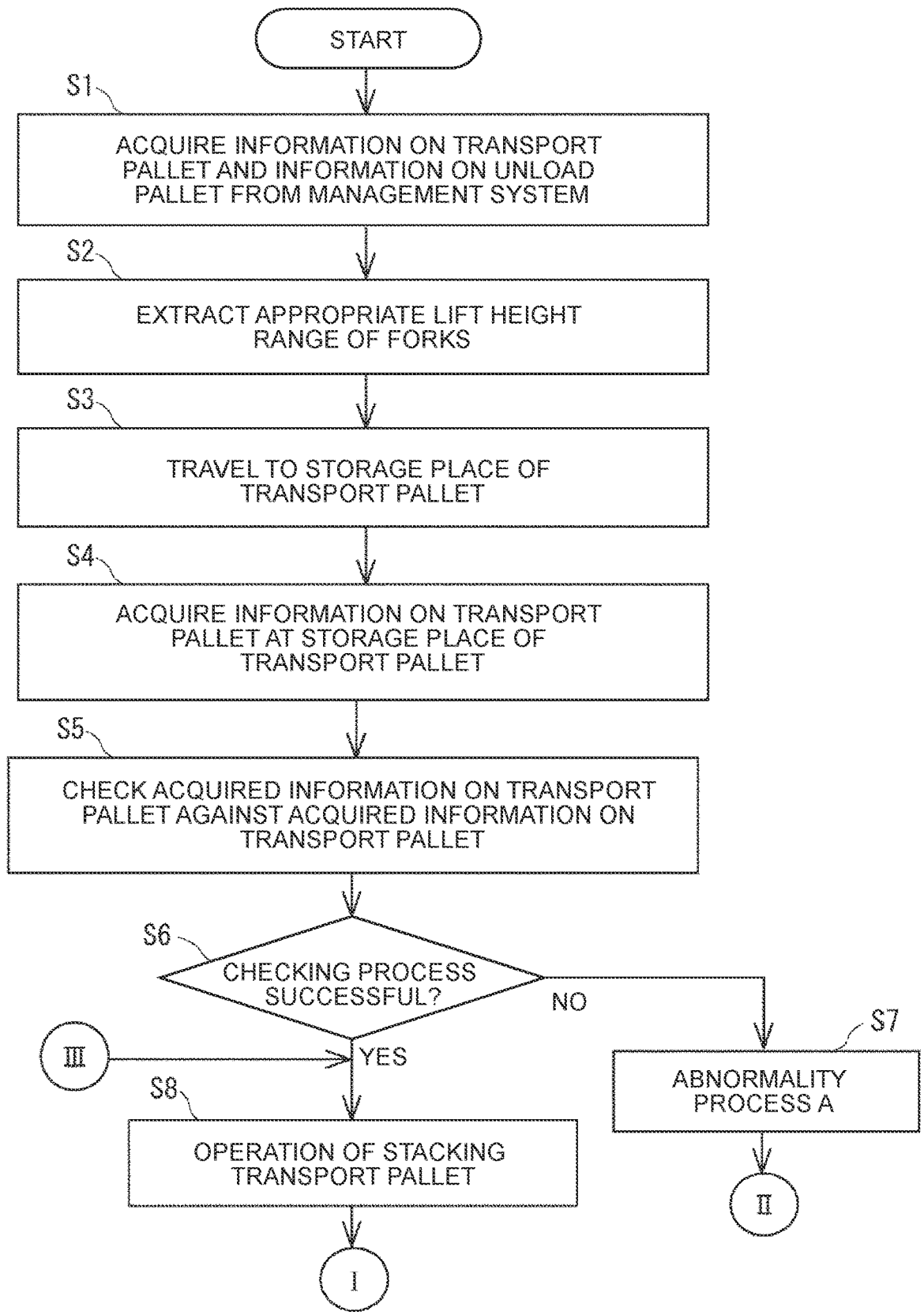
FIG. 7 is a flowchart illustrating an example of a control method according to the embodiment.
Figure 8:
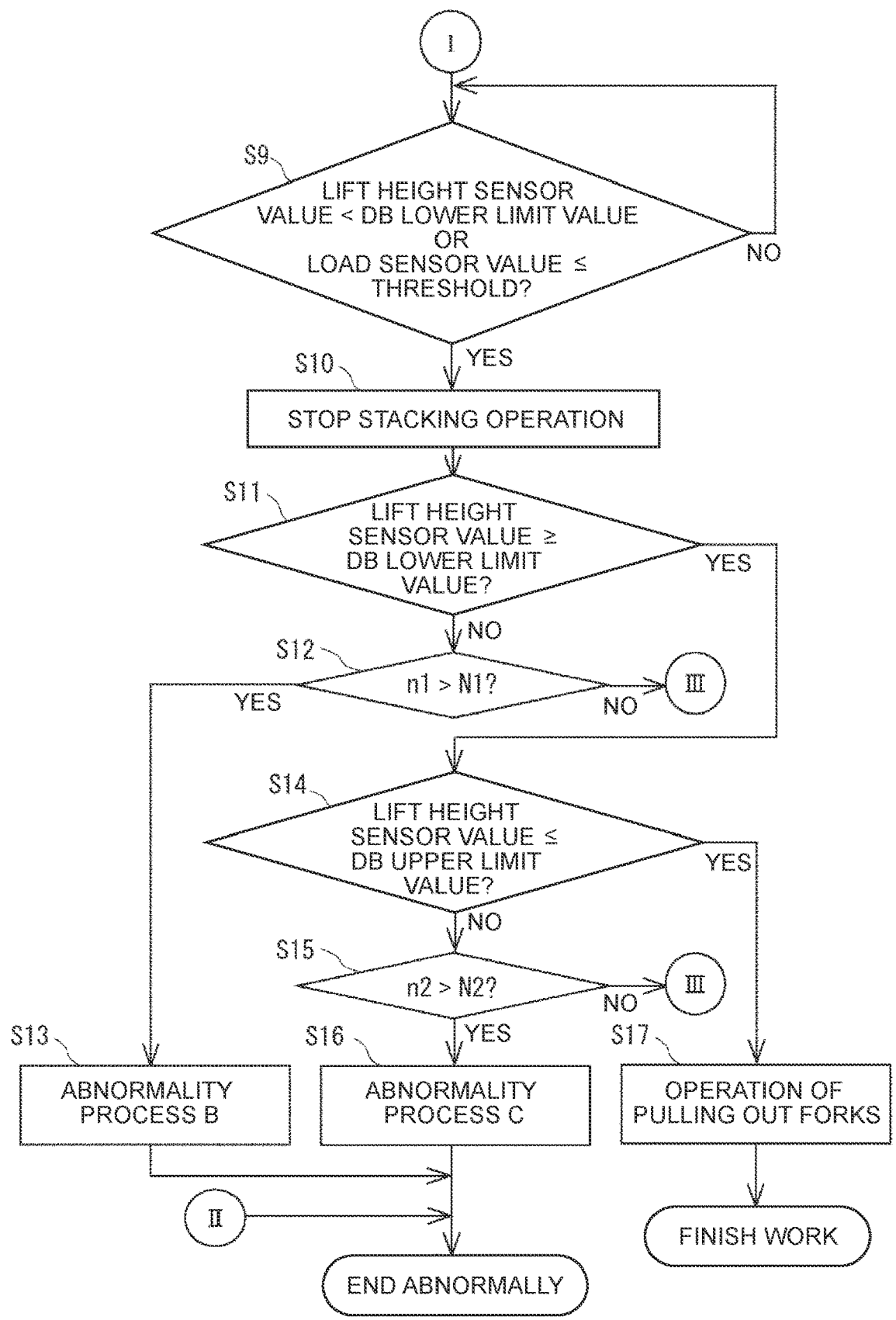
FIG. 8 is a flowchart following FIG. 7.
Figure 9:
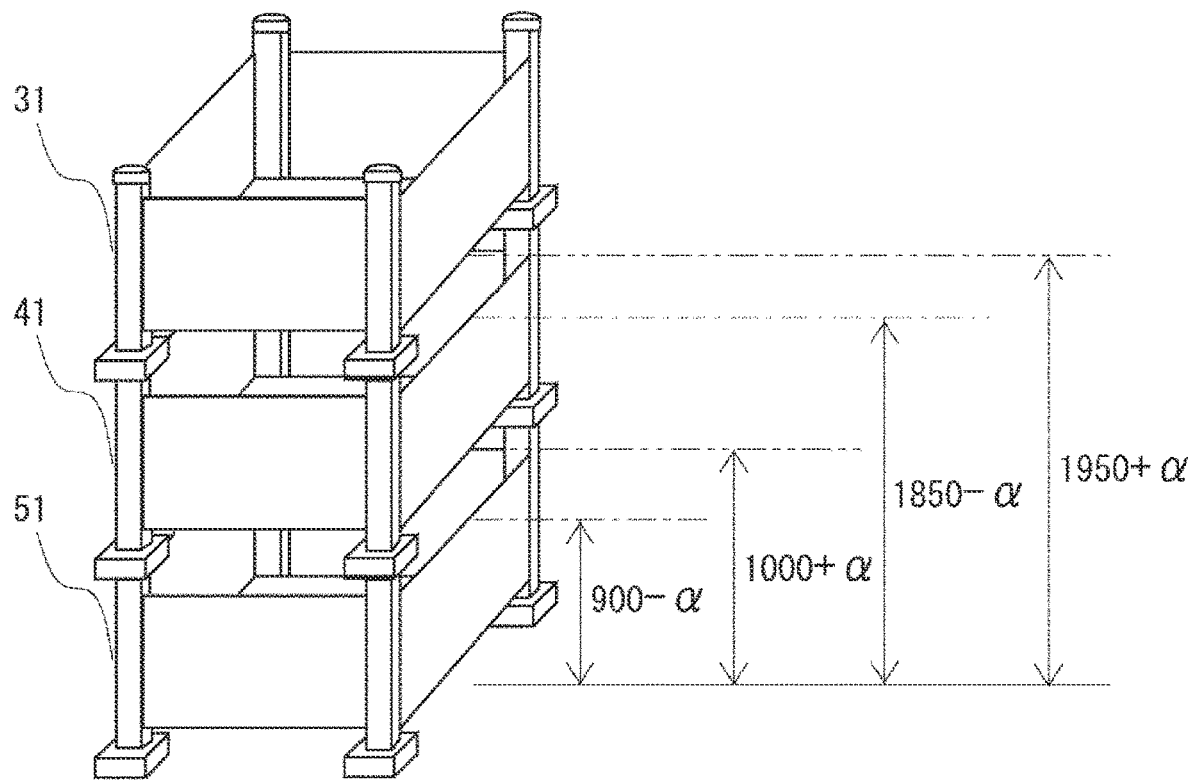
FIG. 9 shows another example of the data that is registered in the database.
Figure 10:
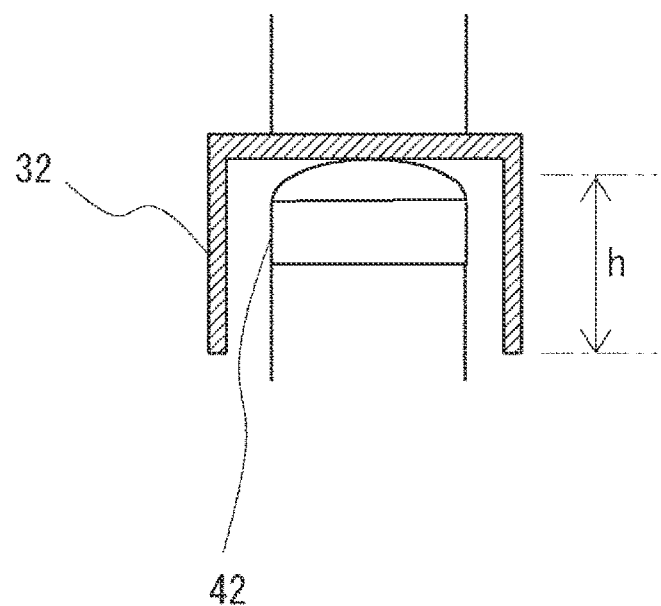
FIG. 10 illustrates the data in FIG. 9.
Figure 11:
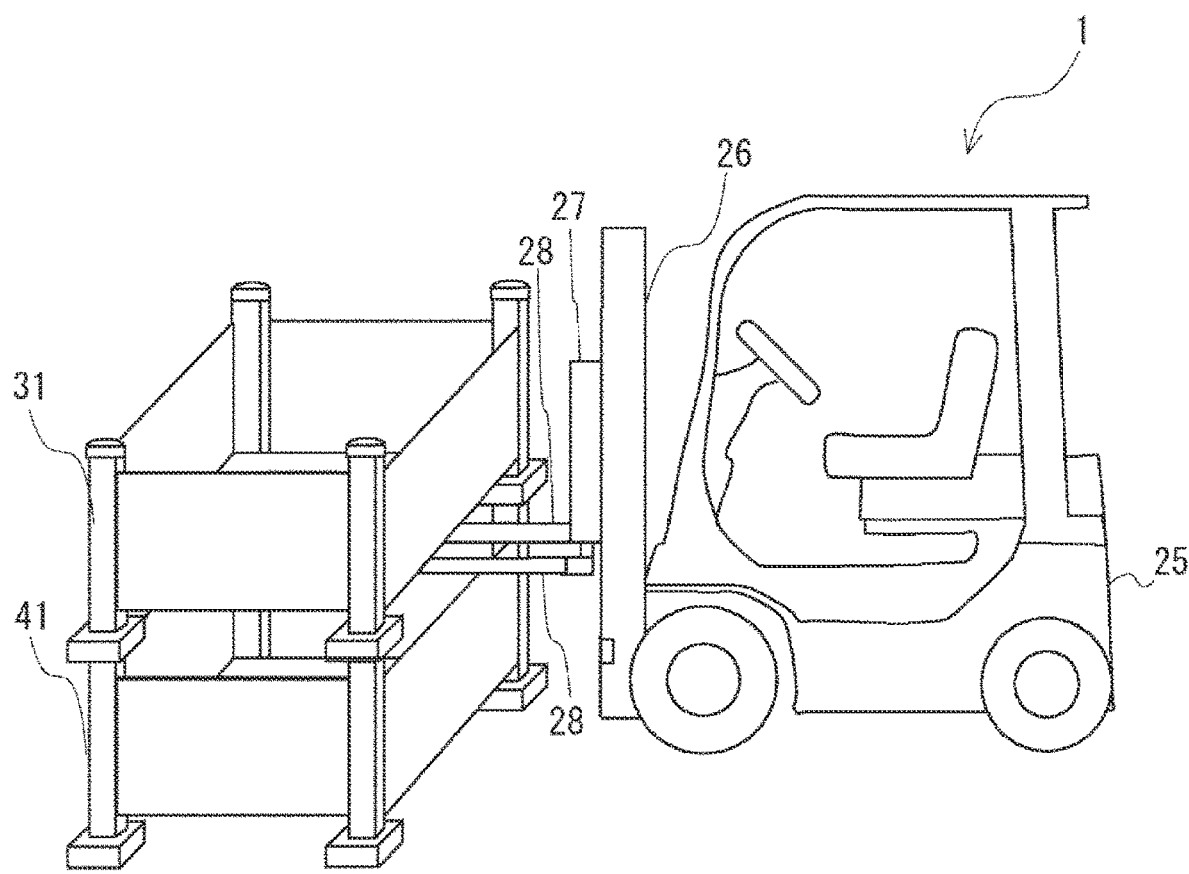
FIG. 11 shows an example of the state in which unloading is successful.

Next, an example of the control method according to the present embodiment will be specifically described with reference to FIGS. 7 to 15. FIG. 7 is a flowchart illustrating an example of the control method according to the present embodiment, and FIG. 8 is a flowchart following FIG. 7. FIG. 9 shows another example of the data that is registered in the DB 2a, and FIG. 10 illustrates the data shown in FIG. 9. FIG. 11 shows an example of the state in which unloading is successful, and FIGS. 12 to 15 shows examples in which it is determined that there is an abnormality.

First, the control device 10 of the forklift 1 acquires information on the transport pallet 31 and information on the unload pallet 41 from the management system 2 (step S1). This acquisition can be, for example, receiving a stacking instruction from the management system 2. The information on the transport pallet 31 includes load information indicating the load including the load including cargo placed the transport pallet 31 and information indicating the position of the transport pallet 31. The information on the unload pallet 41 also includes information indicating the position of the unload pallet 41, that is, the position of the place where the transport pallet 31 is to be unloaded. The information indicating the position of the transport pallet 31 and the position of the unload pallet 41 can be managed by a transportation management system (not shown) different from the DB 2a, but may be included in the DB 2a.

In a situation where the unload pallets for the pallet PA are stacked in two tiers, the control device 10 acquires in step S1 the information on the unload pallets 41, 51 or the information on the unload pallet 41 considering that the unload pallet 41 is stacked on the unload pallet 51 (information on the third tier in FIG. 6). Although the situation where the unload pallets are stacked in two tiers are described, a similar concept can be applied to examples in which the number of tiers is one or three or more.

Next, the control device 10 extracts an appropriate lift height range of the forks 28 based on the acquired information (step S2). For example, when the place where the unload pallet 41 is placed in one tier is the unloading place, the lower and upper limit values for the second tier in FIG. 6 can be extracted as the appropriate lift height range from the acquired information. As described above, in step S2, the current vertical position of the unload pallet 41, that is, the number of tiers, is referred to, and the appropriate lower and upper limit values of the lifting height of the forks 28 are extracted from the information acquired from the DB 2a.

Next, the control device 10 controls the wheel drive unit 21 so that the forklift 1 travels to a storage place where the transport pallet 31 is stored, based on the measurement result or estimation result of the self-position of the forklift 1 and the acquired information indicating the position of the transport pallet 31 (step S3).

The control device 10 then acquires information on the transport pallet 31 at the storage place where the transport pallet 31 is stored by the information acquisition unit 11 or an information acquisition unit such as a camera etc., not shown, separately mounted on the forklift 1 (step S4). The information on the transport pallet 31 stored in the storage area can be, but is not limited to, information indicating the weight of cargo and the unloading place indicated by, for example, a QR code (registered trademark) or barcode attached to any one of the following: the transport pallet 31, cargo placed on the transport pallet 31, or the storage area. This information can also include information such as, for example, a pallet number.

Subsequently, the control device 10 checks the information on the transport pallet 31 acquired in step S1 against the information on the transport pallet 31 acquired in step S4 (step S5). The determination unit 14 can make a determination that will be described below, including this checking process.

The control device 10 determines whether the checking process in step S5 is successful (step S6). When the checking process is not successful (NO in step S6), the control device 10 performs an abnormality process A (step S7) and ends abnormally. The abnormality process A can be, for example, a process of sending to the management system 2 etc. a notification indicating that the transport pallet 31 to be unloaded is wrong. The control device 10 may also send a success notification when the checking process described below is successful.

When the checking process is successful (YES in step S6), an operation of stacking the transport pallet 31 is performed (step S8). This stacking operation first includes placing the transport pallet 31 onto the forks 28. The stacking operation after the operation of placing the transport pallet 31 onto the forks 28 can include an operation of moving to the unloading place and an operation of lowering the forks 28. At least this lowering operation is performed while monitoring the lift height sensor value that is the sensor value detected by the lift height sensor 24 and the load sensor value that is the sensor value detected by the load sensor 23.

As described in step S4, the control device 10 can acquire first information, namely the information on the transport pallet 31, at the position where the transport pallet 31 is to be placed onto the forks 28. Thereafter, as described in steps S5 to S8, the control device 10 can perform the checking process of checking the acquired first information against second information, namely the information on the transport pallet 31 corresponding to the load information and lift height range information acquired from the DB 2a, and can perform the lowering operation when the checking process is successful. This configuration can eliminate or reduce the possibility that the transport pallet 31 may be transported to a wrong unloading place, in other words, the possibility that a wrong transport pallet 31 may be transported to an unloading place, and can thus prevent or reduce such unloading onto an unloading place that causes collapse of load.

Positioning that can be applied to the stacking operation after the operation of placing the transport pallet 31 onto the forks 28 will be described. This positioning method is also applicable to the operation of placing the transport pallet 31 onto the forks 28. Regarding the lateral positions of the forks 28, the management system 2 can detect the position of the stored unload pallet 41 by a sensor etc. installed in the work area for the forklift 1, and send the detected value to the forklift 1. The control device 10 can turn the forklift 1 right or left and move the forklift 1 so that the positions of the forks 28 match the sensor value. Alternatively, in the case where the forklift 1 is equipped with a fork shift mechanism that moves the forks 28 right and left, the control device 10 can control the fork shift mechanism so that the positions of the forks 28 match the sensor value. In the case where the forklift 1 is not equipped with the fork shift mechanism, this alignment in the lateral direction can be performed by adjusting the position of the forklift 1 before approaching the unload pallet 41. In the case where the forklift 1 is equipped with the fork shift mechanism, this alignment in the lateral direction can be performed before the stacking operation (before the forks 28 are lowered).

Regarding the longitudinal positions of the forks 28, the control device 10 grasps the position of the forklift 1 using a self-position estimation function such as simultaneous localization and mapping (SLAM) or laser guidance. The position of the unload pallet 41 onto which the transport pallet 31 is to be unloaded is checked by a sensor mounted on the forklift 1 or an external sensor, and the forklift 1 is moved toward the unload pallet 41. When the forklift 1 reaches a predetermined position for unloading, the brake is depressed so that the forklift 1 stops at that position. At this time, the forklift 1 is moved backward, if necessary. Since sufficient accuracy may not be achieved by SLAM alone, the sensor that detects the position of the unload pallet 41 is installed. Improvement in accuracy can thus be expected.

However, even when the sensor that detects the position of the unload pallet 41 is mounted, the forklift 1 cannot accurately reach a correct position for stacking if a sensor that measures or estimates the self-position of the forklift 1 has poor accuracy. However, in the present embodiment, it is possible to detect situations where collapse of load is likely to occur, as will be described later. Therefore, this can compensate for such poor accuracy of the self-position. For a similar reason, it can be said that the present embodiment is useful even if such a sensor that detects the position of the unload pallet 41 is not mounted, because it is possible to detect situations where collapse of load is likely to occur.

The stacking operation after the operation of placing the transport pallet 31 onto the forks 28 will further be described. After step S8, the control device 10 determines whether only one of the following two conditions is satisfied (step S9): the lift height sensor value is smaller than the lower limit value of the lift height range acquired from the DB 2a; and the load sensor value is equal to or less than a threshold. At this time, the operation of lowering the forks 28 from above is being performed as described above, and it is assumed that these two conditions will not be satisfied at the same time. This threshold is the predetermined value described above. When the load sensor value is equal to or larger than the threshold, it means that the transport pallet 31 is located on the forks 28. The stacking operation is continued until it is determined that one of the two conditions. When one of the two condition is satisfied, that is, when YES in step S9, the control device 10 stops the stacking operation (step S10). This stop control is not only performed when the work is finished, but also performed for safety purposes when there is a possibility of an abnormality. Whether the work is finished or there is a possibility of an abnormality can be determined as will be described below.

Another example of the set values in the DB 2a will be described with reference to FIGS. 9 and 10. FIG. 9 shows the pallets 31, 41, and 51 stacked in three tiers as in the example shown in FIG. 4. The lift height range indicates the range in which the forks can be inserted, and can be expressed by its lower limit value (lower end value) and upper limit value (upper end value).

The lower limit values of the lift height ranges can be registered in the DB 2a as the actual design values in the example of FIG. 4 minus α (mm), like "900−α" (mm) from the ground to between the first and second tiers and "1850−α" (mm) from the ground to between the second and third tiers. Alternatively, the control device 10 may subtract a (mm) from the actual design values and use the resultant values to make a determination.

The upper limit values of the lift height ranges can be registered in the DB 2a as the actual design values in the example of FIG. 4 plus α (mm), like "1000+α" (mm) from the ground to between the first and second tiers and "1950+α" (mm) from the ground to between the second and third tiers. Alternatively, the control device 10 may add α (mm) to the actual design values and use the resultant values to make a determination.

In this example, as shown in FIG. 10, a can be, for example, a value corresponding to the height h of the overlapping part of the support portion 42 with the leg 32 when the support portion 42 is engaged with the leg 32, and can be a value considering variation among the pallets PA. FIG. 6 shows an example in which α for the upper limit values is registered in advance as 10 (mm) and a for the lower limit values is registered in advance as 0 (mm). The value considering variation among the pallets PA can thus be varied between the upper limit values and the lower limit values. The value α can be different for each type of pallet PA, and may be set in advance to, for example, β (%) of variation among the pallets PA.

As described with reference to FIGS. 9 and 10, the lift height range indicated by the lift height range information that is stored in the DB 2a and that is to be acquired or the lift height range to be used to make a determination can be the range described below. The lift height range that is eventually used to make a determination can be the range of height in which the forks 28 can be inserted when unloading onto the unloading place is successful, as calculated based on the type of pallet PA, plus the value of variation among the pallets PA (value considering variation among the pallets PA). Variation among the pallets PA can refer to dimensional variation that can occur during manufacturing. By using such settings, it can be determined that there is an abnormality when there is clearly an abnormality, so that it can be avoided to determine that there is an abnormality when stacking is successful. Such an abnormality that causes collapse of load can thus be detected in consideration of variation among the transport pallets 31, that is, variation among the pallets PA.

Referring back to FIGS. 7 and 8, after S10, the control device 10 determines whether the lift height sensor value is equal to or larger than the lower limit value of the lift height range acquired from the DB 2a (step S11). When NO in step S11, the control device 10 determines whether the number of retries n1 is larger than a predetermined set value N1 (step S12).

Figure 12:
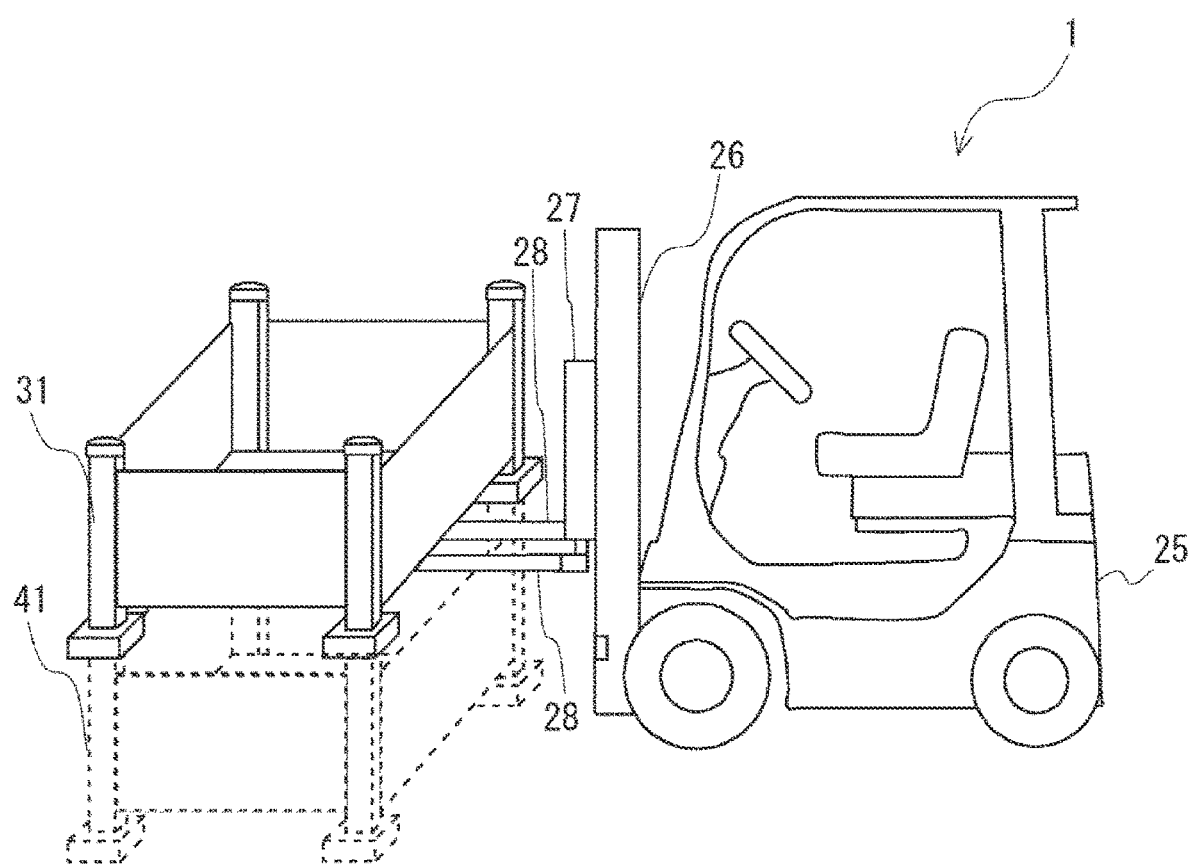
FIG. 12 shows an example of the state in which it is determined that there is an abnormality.
Figure 13:
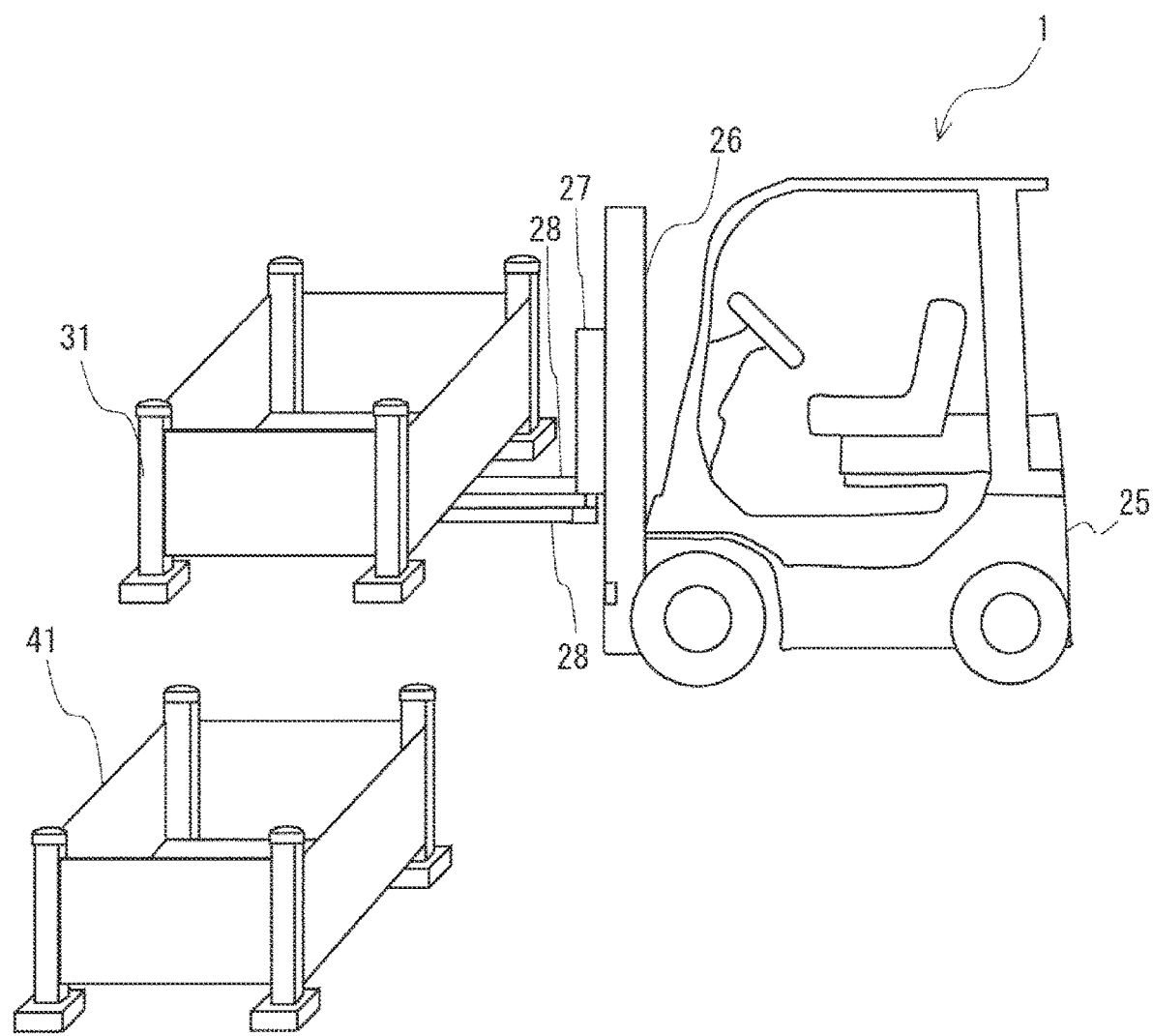
FIG. 13 shows another example of the state in which it is determined that there is an abnormality.
Figure 14:
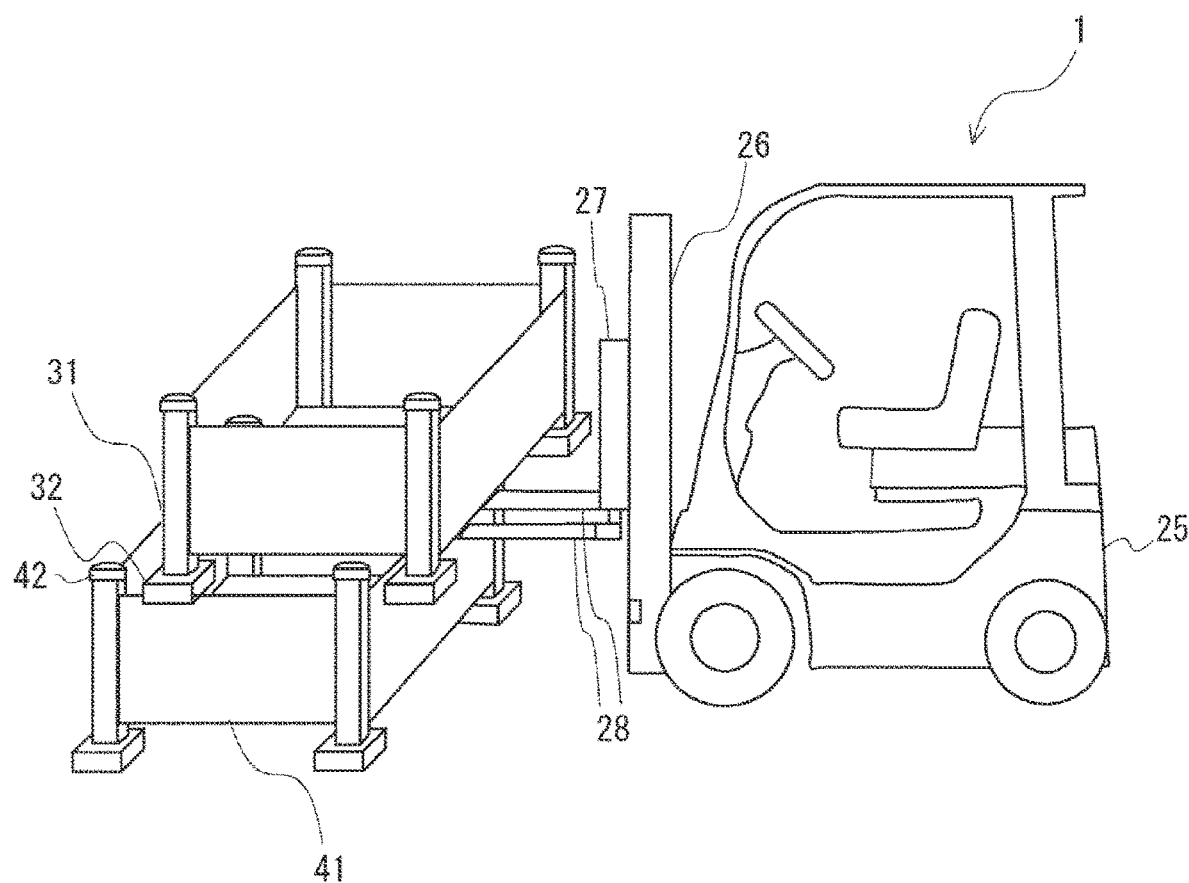
FIG. 14 shows still another example of the state in which it is determined that there is an abnormality.

When YES in step S12, the cases illustrated in FIGS. 12, 13, and 14 are possible. FIG. 12 shows the case where the position of the stacking operation is greatly deviated due to the accuracy of the measurement result of the self-position or the measurement results etc. and there is no unload pallet 41 nearby, or the case where the unload pallet 41 that is supposed to be present at the unloading place is not present anyway. FIG. 12 shows an example in which pallets are supposed to be stacked in two tiers. When there is no pallet in the (x−1)th tier included in the information acquired in step S1 (where x is the number of tiers in which pallets are to be stacked) and it is not possible to stack pallets in a designated number of tiers, there is a pallet(s) PA in the tier(s) below, but it can be said that this is similar to the case illustrated in FIG. 12.

FIG. 13 shows the case where the position of the stacking operation is greatly deviated due to the accuracy of the measurement result of the self-position or the measurement results etc. and the unload pallet 41 is not located at the position of the lowering operation. FIG. 14 shows the case where the position of the stacking operation is deviated due to the accuracy of the measurement result of the self-position or the measurement results etc., and the upper ends of the engagement portions of the legs 32 are located below the upper ends of the support portions 42 and the transport pallet 31 is placed on the unload pallet 41 in a displaced manner.

Therefore, when YES in step S12, the control device 10 performs an abnormality process B (step S13) and ends abnormally. The abnormality process B can be, for example, a process of sending to the management system 2 etc. a notification indicating that the current state is one of the states shown in FIGS. 12 to 14. The control device 10 may also send a notification indicating that the stacking operation is being retried in a manner that will be described later, when NO in step S12.

When NO in step S12, the process returns to step S8, and the control device 10 retries the stacking operation. However, as described above, the operation of placing the transport pallet 31 onto the forks 28 is necessary only for the first time. As used herein, "retry" means making another approach for stacking. The number of retries n1 is the number of times the determination result of YES has been obtained in step S12. This number is stored in a memory of the control device 10 etc. and is read when necessary.

The stacking operation is retried when it is determined that there is an abnormality during the lowering operation. Therefore, when retrying the stacking operation, the control device 10 returns the forklift 1 to the initial position, namely the position where the lowering operation was started, and resumes the lowering operation at the initial position. With such a retry, it is possible to attempt unloading again even when collapse of load is likely to occur. This can increase the possibility that unloading can be performed without causing collapse of load, and can reduce the time required for the work to be done by an administrator etc. to deal with abnormalities.

When retrying the stacking operation, the control device 10 may return the forklift 1 to a predetermined position and resume at the predetermined position the operation of moving the forklift 1 to the position where the lowering operation is to be performed, instead of resuming the lowering operation at the initial position. It is thus possible to attempt unloading again even when collapse of load is likely to occur. This can increase the possibility that unloading can be performed without causing collapse of load, and can reduce the time required for the work to be done by the administrator etc. to deal with abnormalities.

The predetermined position can be, for example, the position at a predetermined distance from the unloading place, or the position where the position of the unload pallet 41 can be checked by the camera mounted on the forklift 1 or installed at the work place. The control device 10 thus makes another approach while correcting the self-position, and repeats this as necessary. The forklift 1 can thus be located at a good position.

As described regarding the determination of step S12 and step S13, the control device 10 may stop control for unloading onto the unloading place when the number of times it is determined that there is an abnormality during the lowering operation reaches a predetermined value (N1). This can prevent repeated unloading attempts when there is a high possibility of collapse of load.

When YES in step S11, the determination result of step S9 is YES, which means that the load sensor value is less than the threshold, that is, the transport pallet 31 is not located on the forks 28. Therefore, in this case, when the lift height sensor value is equal to or less than the upper limit value of the lift height range acquired from the DB 2a, it means that the current state is the state illustrated in FIG. 11, namely the state in which unloading is successful.

Therefore, the control device 10 determines whether the lift height sensor value is equal to or less than the upper limit value of the lift height range acquired from the DB 2a (step S14). When YES in step S14, it means that the lift height sensor value is within the lift height range acquired from the DB 2a and the load sensor value is equal to or less than the threshold, namely unloading is successful. Therefore, when YES in step S14, the control device 10 performs an operation of pulling out the forks 28 by at least one of the following methods: moving the forklift 1; and retracting the forks 28 (step S17). By step S17, the unloading work is successfully finished. Thereafter, the forklift 1 may be moved back to, for example, the designated original position.

When NO in step S14, the control device 10 determines whether the number of retries n2 is larger than a predetermined set value N2 (step S15). When NO in step S15, the process returns to step S8, and the control device 10 continues the stacking operation. However, as described above, the operation of placing the transport pallet 31 onto the forks 28 is necessary only for the first time. The number of retries n2 is different from the number of retries n1, and is the number of times the determination result of YES has been obtained in step S15. This number is stored in the memory of the control device 10 etc. and is read when necessary.

When NO in step S15, the process returns to step S8, and the control device 10 retries the stacking operation. However, as described above, the operation of placing the transport pallet 31 onto the forks 28 is necessary only for the first time. The retry is otherwise as described above for when NO in step S12. However, the predetermined number of times in this case is N2.

Figure 15:
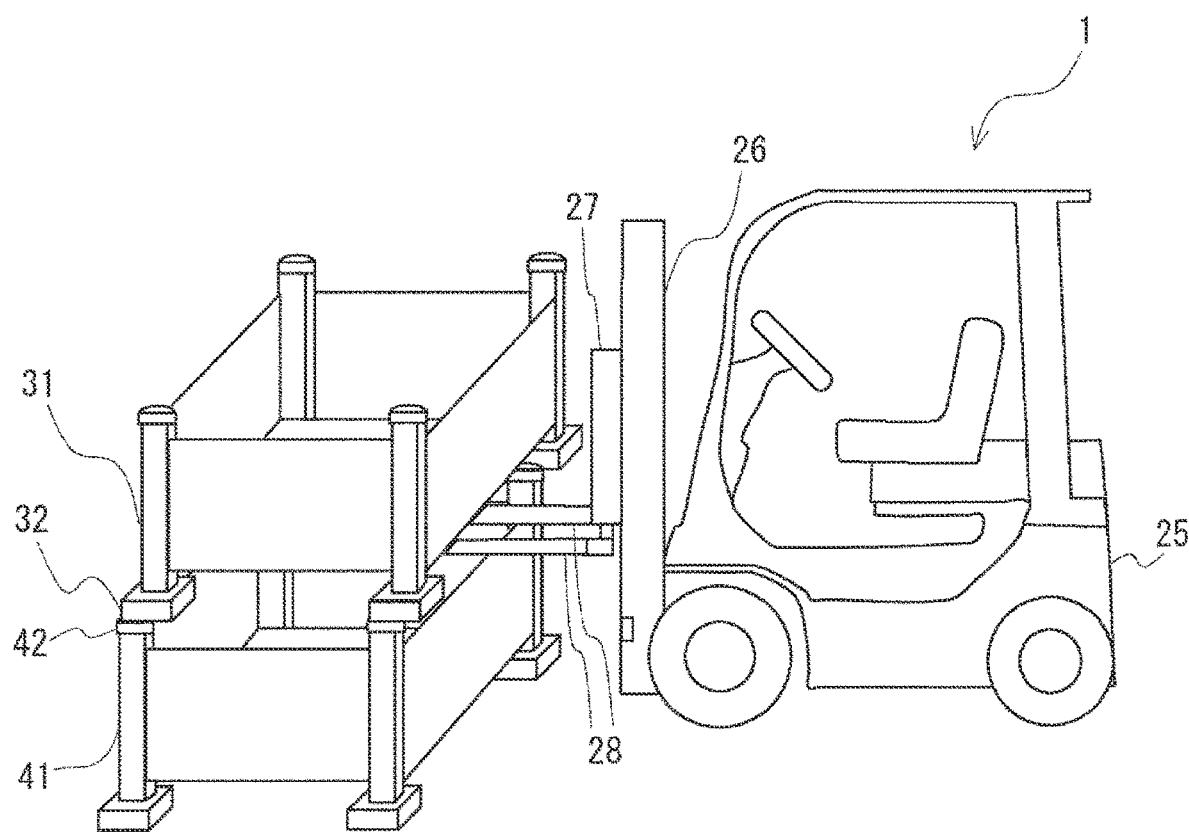
FIG. 15 shows yet another example of the state in which it is determined that there is an abnormality.

When YES in step S15, as illustrated in FIG. 15, it is possible that the lower ends of the legs 32 have been placed on the upper ends of the support portions 42 in a displaced manner due to the accuracy of the measurement result of the self-position or the measurement results etc. Therefore, when YES in step S15, the control device 10 executes the abnormality process C (step S16) and ends abnormally. The abnormality process C can be, for example, a process of sending to the management system 2 etc. a notification indicating that the current state is the state shown in FIG. 15. The control device 10 may also send a notification indicating that the stacking operation is being retried, when NO in step S15.

As described above, according to the present embodiment, such an abnormality that causes collapse of load when the forklift 1 unloads the transport pallet 31 onto the unloading place can be detected at low cost. According to the present embodiment, collapse of load can thus be prevented or reduced.

An example of an unmanned forklift capable of detecting the height to which the forks should be advanced (height at which the forks should be inserted) will be described as a comparative example, and the effects of the present embodiment will be described. The unmanned forklift according to the comparative example can detect the heights for load pickup and loading, but cannot detect the plane position accuracy during loading. Therefore, the pallets may collapse. However, according to the present embodiment, collapse of load can be prevented or reduced.

If pallets collapse not only in the comparative example but also in other situations, the operation rate decreases due to reduced safety caused by contact with falling objects, reduced cost and quality resulting from occurrence of defective products in the pallets, and increased time required to deal with abnormalities. In particular, when it is desired to use a plurality of types of pallets of different shapes, that is, in order to configure a system that can stack pallets of any size and shape and correctly stack them repeatedly without being affected by disturbance, high accuracy is required for the following plurality of factors. Therefore, this is technically difficult and requires a large investment. The plurality of factors includes the accuracy in recognizing the position of the unload pallet, the accuracy of the position at which the forklift is stopped, the accuracy of the position to which the fork is raised or lowered, and the accuracy of the pallet dimensions.

It is also possible to use a method in which the legs of the unload pallet is checked by a camera etc. before stacking. However, this is difficult because, when a camera that can be mounted on the forklift is used, the transport pallet will block the camera's field of view. It is also possible to use a method in which the legs of the unload pallet is checked by a ceiling camera etc. However, this is difficult in terms of accuracy, and requires a large investment if the area is large. Moreover, the transport pallet may slip due to rotation or vibration during transportation of the pallet, so that the position of the pallet on the forks during load pickup may be different from the position of the pallet on the forks during stacking.

However, according to the present embodiment, collapse of load can be prevented or reduced at low cost. The unload pallet 41 is herein described as an example of the unloading place. However, even when the unloading place is a level ground etc., a similar operation can be performed by registering lift height range information for the level ground etc. in the DB 2a. Such an example will be described with reference to FIGS. 16 and 17.

Figure 16:
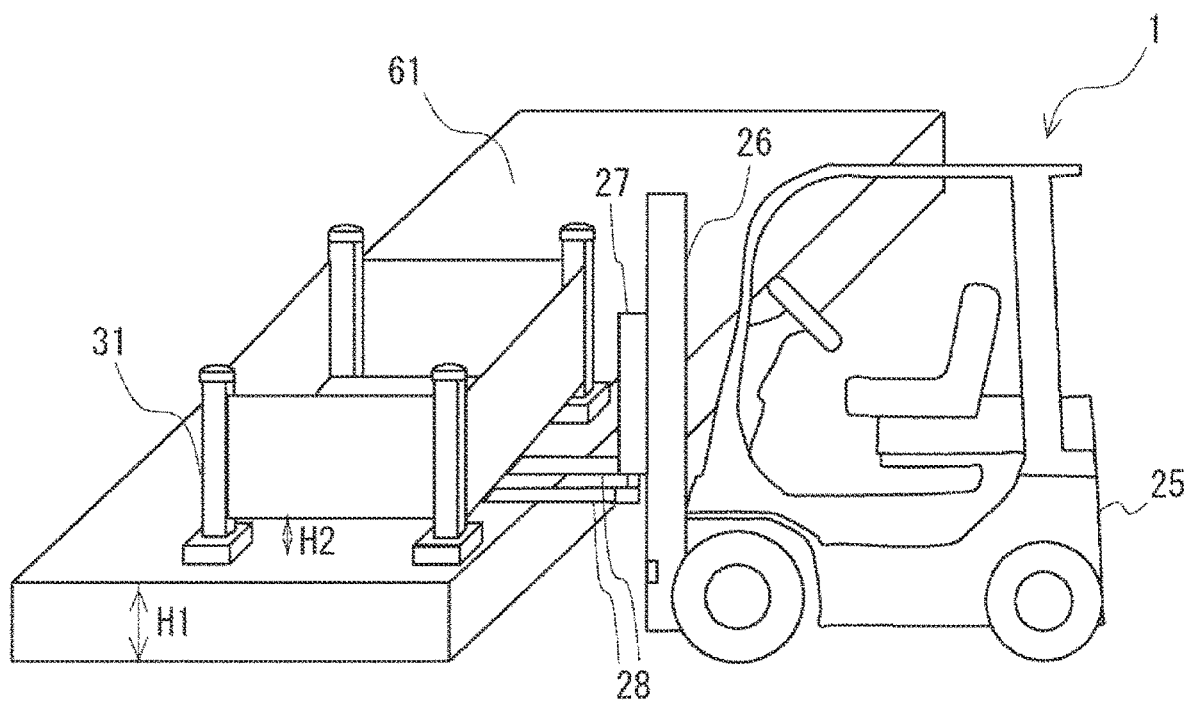
FIG. 16 shows an example of how unloading is performed when an unloading place is a base plate.

FIG. 16 shows an example of how unloading is performed when an unloading place is a base plate with a height H1 from the ground. In the present embodiment, a horizontal platform higher than the ground, such as a base plate 61 shown in FIG. 16, can also be used as the unloading place. In this case, the range in which the forks 28 can be inserted has a lower limit value of H1 and an upper limit value of "H1+H2," and these upper and lower limit values can be registered as lift height range information. The various examples described above can be applied to other examples.

With this configuration, for example, even if an unexpected obstacle etc. is located on the unloading place, possible collapse of load due to the pallet being placed on the obstacle can be detected. In particular, unloading is more likely to be performed with the pallet floating due to sensor error as compared to the case where determination based only on the lift height sensor value is used. In this example, however, whether there is an abnormality is determined using the lift height sensor value and the load sensor value.

Therefore, an abnormality can be detected even in such a situation. In the case where determination based only on the load sensor value is used, an abnormality cannot be detected even if the pallet is placed on an obstacle etc. However, in this example, whether there is an abnormality is determined using the lift height sensor value and the load sensor value, an abnormality can be detected even in such a situation.

Figure 17:
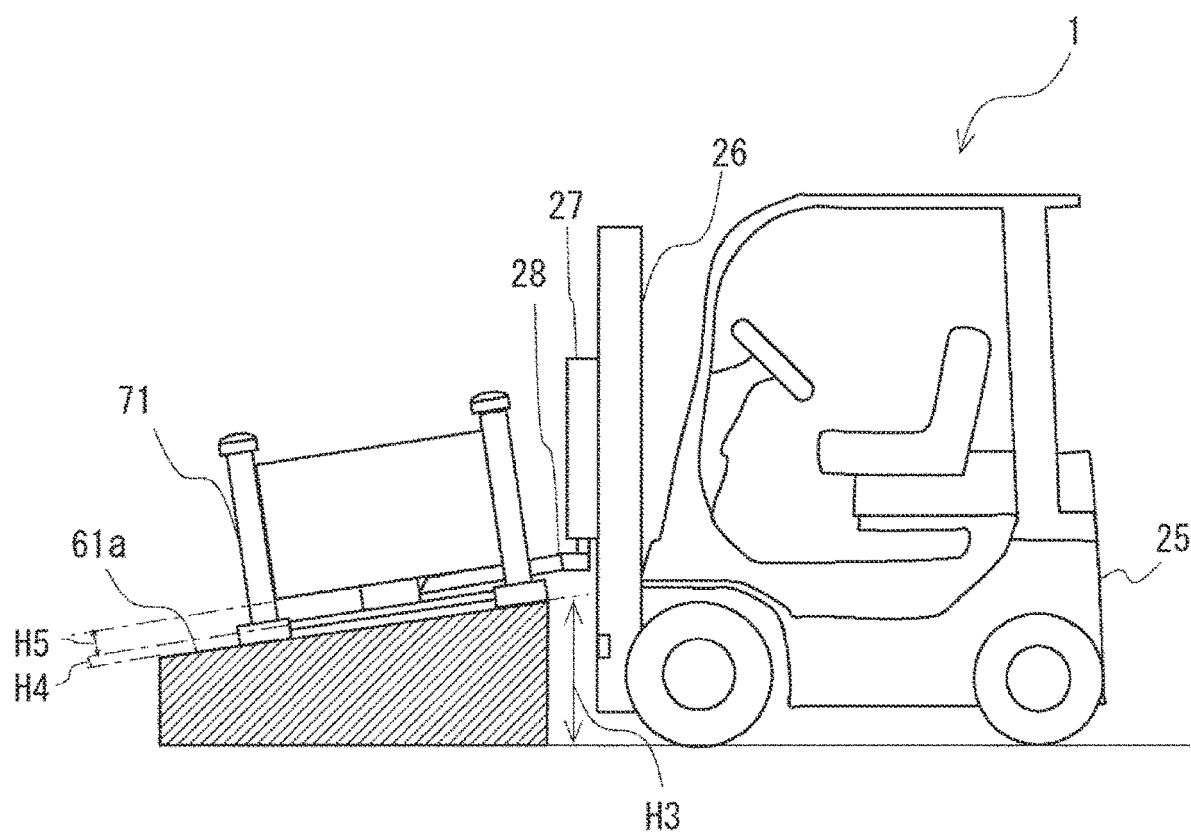
FIG. 17 shows an example of how unloading is performed when an unloading place is a tilted base plate.

FIG. 17 shows an example of how unloading is performed when the unloading place is a tilted base plate. In the present embodiment, a tilted platform higher than the ground, such as a base plate 61*a* shown in FIG. 17, can also be used as the unloading place. This base plate 61*a* can be used as a shooter on a work line for transporting the transport pallet 31. In this example, the transport pallet 71 is a pallet with fork pockets. That is, a transport pallet 71 provided with a member under the space into which the forks 28 are inserted is used instead of the transport pallet 31. In the transport pallet 71, the forks 28 can be inserted in the range indicated by the height H5. The forklift 1 illustrated in FIG. 17 includes a mechanism that can change the angle of elevation or depression of the forks 28. The angle of the forks 28 can be adjusted to the angle of the surface of the base plate 61*a* when placing the transport pallet 71 onto the base plate 61*a*. A mechanism that changes the angle of elevation or depression of the mast 26 with respect to the body 25 as described above may be provided to change the angle of elevation or depression of the forks 28.

In this case, the range in which the forks 28 can be inserted has a lower limit value of "H3+H4" and an upper limit value of "H3+H4+H5," and these upper and lower limit values can be registered as lift height range information. The various examples described above can be applied to other examples.

The height H3 is illustrated as, but not limited to, the height of the position of the bases of the forks 28 located on the plane along the slope of the base plate 61*a*. For example, when changing the tilt of the forks 28 in this manner, the database of the lower and upper limit values are prepared in advance in consideration of this height. Since the height of the bases of the forks 28 is used as a reference, the information to be registered in the DB 2*a* need not be changed even when the forks 28 are tilted. The load sensor does not particularly change between a tilted surface and a flat surface.

It is also possible to switch the DB to be used depending on the unloading place, namely depending on the usage of the forklift 1. This can be applied to switching between at least two of the various examples described above. The transport pallet 71 can be applied to the examples described with reference to FIGS. 1 to 16. In such cases, the lift height range information is registered based on a similar concept.

When unloading a pallet with fork pockets as illustrated is unloaded onto the tilted base plate 61*a* such as a shooter, the pallet will not move when the pallet is floating from the base plate 61*a* (in a floating state) and when is being pushed down by the forks 28. Therefore, accurate lift height control is required. However, in the present embodiment, an abnormality that is likely to cause collapse of load can be detected at low cost even when such accurate control is required.

As can be seen from the examples of FIGS. 16 and 17, the lift height range can be the range of height in which the forks 28 can be inserted when the unloading place is an object that is not transportable by the forklift 1 or the ground (floor etc.) and when the transport pallet 31 is successfully placed (placed flat) on this object or the ground. Alternatively, the object may be the bed of a truck.

On the other hand, as described above with reference to FIGS. 1 to 15, the lift height range can be the range of height in which the forks 28 can be inserted when the unloading place is the unload pallet 41 on which the transport pallet 31 can be stacked, such as a transport pallet of the same shape as the transport pallet 31, and when the transport pallet 31 is successfully placed on the unload pallet 41.

By using such a lift height range, such an abnormality that causes collapse of load can be detected at low cost regardless of whether the unloading place is the object or ground described above or a pallet on which the transport pallet 31 can be stacked.

Figure 18:
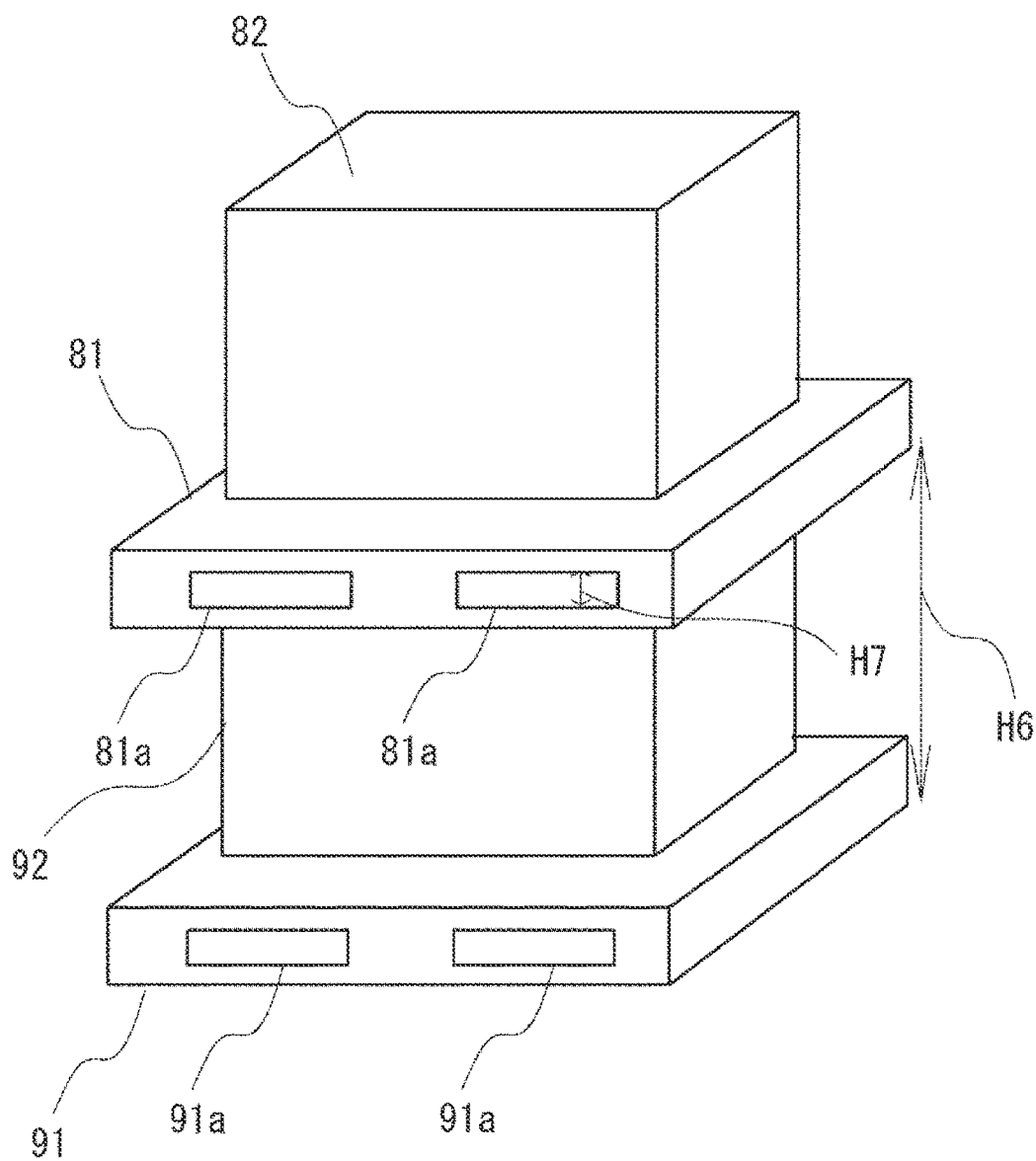
FIG. 18 is a perspective view showing another example of a transport pallet and an unload pallet.

In the various examples described above, it is assumed that the transport pallet is loaded with cargo inside. However, the transport pallet may be a flat pallet. The flat pallet may be a slatted flat pallet. This example will be described with reference to FIG. 18. FIG. 18 is a perspective view showing another example of a transport pallet and an unload pallet.

Both a transport pallet 81 and an unload pallet 91 shown in FIG. 18 are flat pallets, and has insertion holes 81*a*, 91*a* for the forks 28 as fork pockets, respectively. When similar insertion holes are provided in the side surfaces perpendicular to the illustrated surfaces having the insertion holes 81*a*, 91*a*, the forks 28 can be inserted from any side.

In the example of FIG. 18, not only an item 82 is placed on the transport pallet 81, but also an item 92 is placed on the unload pallet 91. Therefore, the range in which the forks 28 can be inserted has a lower limit value of H6 and an upper limit value of "H6+H7." These lower and upper values can be registered as lift height range information. The height H6 refers to the distance from the ground to the lower ends of the insertion holes 81*a* of the transport pallet 81. As described above, in the example of FIG. 18, the lift height range indicated by the lift height range information depends on the height of the item 92 placed on the unload pallet 91. Therefore, information on the height of the item 92 is also required. When the item 92 is composed of a plurality of items, that is, when the items are stacked in a plurality of tiers, information on the height of the stack is obtained or calculated. In the example of FIG. 18 as well, the various examples described above can be applied to other examples.

Alternatives Etc.

The forklift according to the above embodiment is not limited to the configuration examples illustrated in FIGS. 1, 2, 17, etc., and is not limited to the shapes illustrated in FIGS. 2 and 17. The forklift according to the above embodiment is not limited to the configuration in which the above control example is performed, and various application examples can be applied the forklift according to the above embodiment. Various examples other than those illustrated in the figures can be applied to the type of pallets, the shape of forks, etc.

Figure 19:
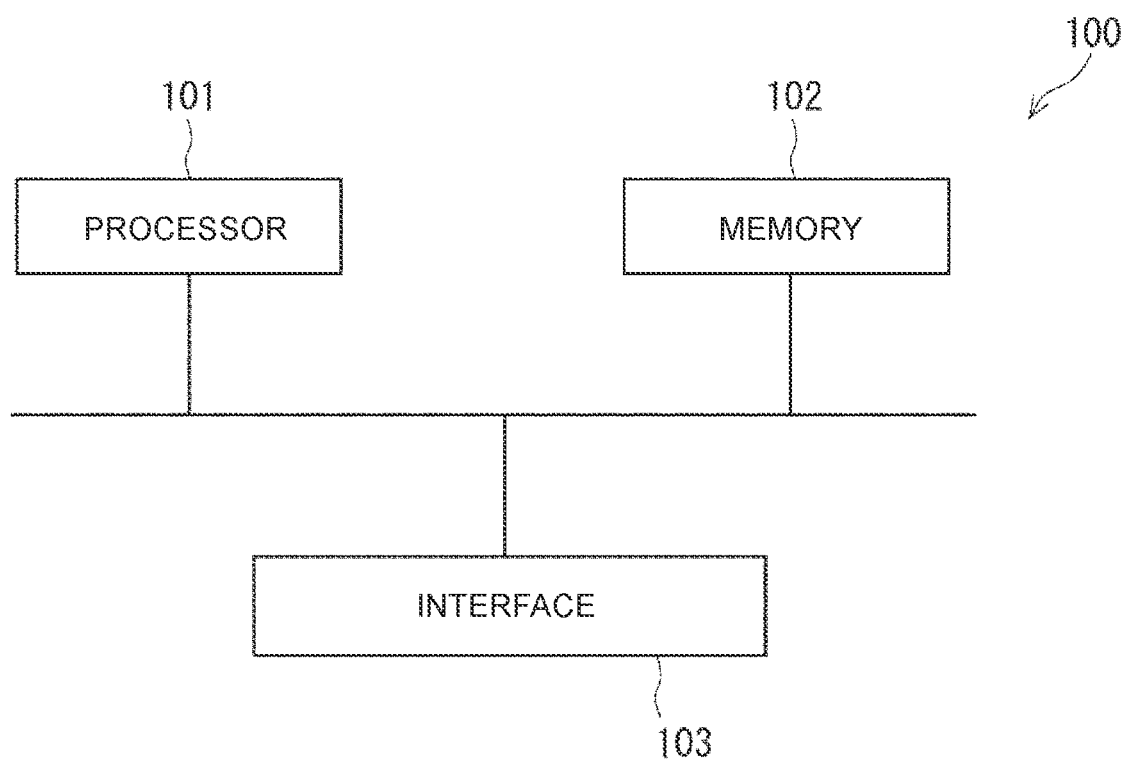
FIG. 19 shows an example of the hardware configurations of a device.

Each of a plurality of devices that forms all devices and systems, such as the control device, control system, management system of the above embodiment, can include, for example, the following hardware configurations. FIG. 19 shows an example of the hardware configurations of such a device.

A device 100 shown in FIG. 19 can include a processor 101, a memory 102, and an interface 103. The interface 103 can include an interface with an operation device that receives user operations, an interface with a display device that displays information, a communication interface for sending and receiving information, etc.

The processor 101 may be, for example, a micro processor, an MPU, or a CPU. The processor 101 may include a plurality of processors. The memory 102 is, for example, a combination of a volatile memory and a non-volatile memory. The functions of each device are implemented by the processor 101 reading a control program stored in the memory 102 and executing it while sending and receiving necessary information via the interface 103.

This program is a program that causes a computer to perform the control method described above. Various application examples described as the control method, control device, and control system can be applied to this program as well.

This program include an instruction group (or software codes) that, when read by a computer, cause the computer to perform one or more of the functions described in the embodiment. The program may be stored in a non-transitory computer-readable medium or a tangible storage medium. Examples of the computer-readable medium or the tangible storage medium include, but are not limited to: a random-access memory (RAM), a read-only memory (ROM), a flash memory, a solid-state drive (SSD), and other memory techniques; a compact disc read-only memory (CD-ROM), a digital versatile disc (DVD), a Blu-ray (registered trademark) disc, and other optical disc storages; and a magnetic cassette, a magnetic tape, a magnetic disc storage, and other magnetic storage devices. The program may be transmitted on a transitory computer-readable medium or communication medium. Examples of the transitory computer-readable medium or communication medium include, but are not limited to, electrical, optical, and acoustic propagation signals and other forms of propagation signals.

The present disclosure is not limited to the above embodiment, and can be modified as appropriate without departing from the spirit and scope of the disclosure.

What is claimed is:

1. A control method for controlling a forklift to unload a transport pallet onto an unloading place, the forklift including a load sensor configured to detect load of an item placed on a fork, and a lift height sensor configured to detect a lift height of the fork, the control method comprising:
    acquiring load information of the transport pallet placed on the fork and lift height range information, the lift height range information indicating a lift height range, the lift height range being a range of height in which the fork is estimated to be positioned when unloading onto the unloading place is successful, the lift height range being determined based at least on a height of the unloading place;
    performing a lowering operation based on the acquired load information and the acquired lift height range information, the lowering operation being an operation of lowering the fork with the transport pallet from above the unloading place;
    performing an operation of pulling out the fork when a load value detected by the load sensor is equal to or less than a predetermined value and a lift height value detected by the lift height sensor is within the lift height range; and
    determining that an abnormality is present when one of a first condition and a second condition is satisfied during the lowering operation, wherein:
    the first condition is a determination by a processor that the lift height value is equal to or less than a lower limit value of the lift height range,
    the second condition is a determination by the processor that the load value is equal to or less than the predetermined value and the lift height value is equal to or larger than an upper limit value of the lift height range,
    the lift height value is a numerical height value detected by the lift height sensor on the forklift, and the lift height range is a range of numerical values starting from the lower limit value to the upper limit value, which is retrieved from a database outside the forklift, and
    the database stores a plurality of lift height ranges each having a different numerical range, and one of the lift height ranges is selected based on the unloading place and retrieved by the forklift to be used in abnormality determination.

2. The control method according to claim 1, wherein:
    the lift height range is a range in which the fork is estimated to be positioned when the unloading place is a ground or an object that is not transportable by the forklift and the transport pallet is successfully placed onto the ground or the object; and
    the lift height range is a range in which the fork is estimated to be positioned when the unloading place is an unload pallet and the transport pallet is successfully placed onto the unload pallet, the unload pallet being a transport pallet on which the transport pallet is to be stacked.

3. The control method according to claim 1, further comprising, when determination is made during the lowering operation that the abnormality is present, resuming the lowering operation at an initial position by returning to the initial position that is a position where the lowering operation is started.

4. The control method according to claim 3, further comprising, stopping control for the unloading onto the unloading place when a number of determination times that the abnormality is present during the lowering operation reaches a predetermined value.

5. The control method according to claim 1, further comprising, resuming at a predetermined position an operation of moving the forklift to a position where the lowering operation is to be performed by returning the forklift to the predetermined position when determination is made that the abnormality is present during the lowering operation.

6. The control method according to claim 1, wherein:
    the lift height range is a range that is to be used for determination that the abnormality is present; and
    the lift height range is calculated based on a type of the transport pallet and is set by adding a variation value among a plurality of the transport pallets.

7. The control method according to claim 1, wherein the forklift is an unmanned forklift.

8. The control method according to claim 1, further comprising:
    acquiring first information at a position where the transport pallet is to be placed onto the fork, the first information being information on the transport pallet;
    performing a checking process of checking the acquired first information against second information, the second information being information on the transport pallet corresponding to the acquired load information and the acquired lift height range information; and
    performing the lowering operation when the checking process is successful.

9. A control device configured to control a forklift to unload a transport pallet onto an unloading place, the forklift including a load sensor configured to detect load of an item placed on a fork, and a lift height sensor configured to detect a lift height of the fork, the control device comprising:

a processor configured to:

control at least one of movement of the forklift and horizontal movement of the fork;

control raising and lowering of the fork;

acquire load information of the transport pallet placed on the fork and lift height range information, the lift height range information indicating a lift height range, the lift height range being a range of height in which the fork is estimated to be positioned when unloading onto the unloading place is successful, the lift height range being determined based at least on a height of the unloading place; and determine whether an abnormality is present, wherein the processor is configured to perform a lowering operation based on the load information and the lift height range information that are acquired, the lowering operation being an operation of lowering the fork with the transport pallet from above the unloading place, the processor is configured to perform an operation of pulling out the fork when a load value detected by the load sensor is equal to or less than a predetermined value and a lift height value detected by the lift height sensor is within the lift height range, the processor is configured to determine that an abnormality is present when one of a first condition and a second condition is satisfied during the lowering operation, the first condition is a determination by the processor that the lift height value is equal to or less than a lower limit value of the lift height range, the second condition is a determination by the processor that the load value is equal to or less than the predetermined value and the lift height value is equal to or larger than an upper limit value of the lift height range, the lift height value is a numerical height value detected by the lift height sensor on the forklift, and the lift height range is a range of numerical values starting from the lower limit value to the upper limit value, which is retrieved from a database outside the forklift, and the database stores a plurality of lift height ranges each having a different numerical range, and one of the lift height ranges is selected based on the unloading place and retrieved by the forklift to be used in abnormality determination.

10. A control system configured to control a forklift to unload a transport pallet onto an unloading place, the control system comprising a control device configured to:

control at least one of movement of the forklift and horizontal movement of a fork, the forklift including a load sensor configured to detect load of an item placed on the fork, and a lift height sensor configured to detect a lift height of the fork;

control raising and lowering of the fork;

acquire load information of the transport pallet placed on the fork and lift height range information, the lift height range information indicating a lift height range, the lift height range being a range of height in which the fork is estimated to be positioned when unloading onto the unloading place is successful, the lift height range being determined based at least on a height of the unloading place;

determine whether an abnormality is present;

perform a lowering operation based on the acquired load information and the acquired lift height range information, the lowering operation being an operation of lowering the fork with the transport pallet from above the unloading place;

perform an operation of pulling out the fork when a load value detected by the load sensor is equal to or less than a predetermined value and a lift height value detected by the lift height sensor is within the lift height range; and determine that an abnormality is present when one of a first condition and a second condition is satisfied during the lowering operation, wherein the first condition is a determination by the control device that the lift height value is equal to or less than a lower limit value of the lift height range, the second condition is a determination by the control device that the load value is equal to or less than the predetermined value and the lift height value is equal to or larger than an upper limit value of the lift height range, the lift height value is a numerical height value detected by the lift height sensor on the forklift, and the lift height range is a range of numerical values starting from the lower limit value to the upper limit value, which is retrieved from a database outside the forklift, and the database stores a plurality of lift height ranges each having a different numerical range, and one of the lift height ranges is selected based on the unloading place and retrieved by the forklift to be used in abnormality determination.

* * * * *